(12) United States Patent
Hanson et al.

(10) Patent No.: US 9,285,385 B2
(45) Date of Patent: Mar. 15, 2016

(54) VECTOR VELOCIMETER

(75) Inventors: Steen Hanson, Fakse (DK); Michael Linde Jakobsen, Roskilde (DK); Theis Iversen, Vanlose (DK); Peter John Rodrigo, Roskilde (DK); Christian Pedersen, Hvidovre (DK)

(73) Assignee: TECHNICAL UNIVERSITY OF DENMARK, Lyngby (DK)

( * ) Notice: Subject to any disclaimer, the term of this patent is extended or adjusted under 35 U.S.C. 154(b) by 530 days.

(21) Appl. No.: 13/816,086

(22) PCT Filed: Jul. 18, 2011

(86) PCT No.: PCT/EP2011/062239
§ 371 (c)(1),
(2), (4) Date: May 20, 2013

(87) PCT Pub. No.: WO2012/019871
PCT Pub. Date: Feb. 16, 2012

(65) Prior Publication Data
US 2013/0222786 A1    Aug. 29, 2013

Related U.S. Application Data

(60) Provisional application No. 61/371,830, filed on Aug. 9, 2010.

(30) Foreign Application Priority Data

Aug. 9, 2010   (EP) .................................... 10172261

(51) Int. Cl.
*G01P 3/36*      (2006.01)
*G01P 5/26*      (2006.01)
*G01S 7/481*     (2006.01)
*G01S 7/491*     (2006.01)
*G01S 17/58*     (2006.01)

(52) U.S. Cl.
CPC . *G01P 3/366* (2013.01); *G01P 5/26* (2013.01); *G01S 7/481* (2013.01); *G01S 7/4912* (2013.01); *G01S 17/58* (2013.01)

(58) Field of Classification Search
CPC ........... G01P 3/366; G01P 5/26; G01S 7/481; G01S 7/4912; G01S 17/58
USPC ............................................................. 356/28
See application file for complete search history.

(56) References Cited

U.S. PATENT DOCUMENTS 4,537,503 A * 8/1985 Liu ............................. 356/28.5
5,164,784 A   11/1992 Waggoner
(Continued)

FOREIGN PATENT DOCUMENTS

| DE | 102 24 761 B3 | 3/2004 |
|----|---------------|--------|
| WO | WO 03 069278 A1 | 8/2003 |
| WO | WO 2009/046717 A2 | 4/2009 |

OTHER PUBLICATIONS

International Search Report for PCT/EP2011/062239, mail date Sep. 14, 2011.
(Continued)

*Primary Examiner* — Mark Hellner
(74) *Attorney, Agent, or Firm* — Lee & Morse, P.C.

(57) ABSTRACT

A vector velocimeter includes a laser emitting a measurement beam with a wavelength λ, for illumination of an object in a measurement volume to create a signal beam, a reference beam generator generating a reference beam, and a first detector arranged such that the signal beam and the reference beam, propagating at a first angle θ relative to the signal beam, are incident thereon. The first detector includes an array of first detector elements to convert the intensity of the interfering signal beam and reference beam incident thereon into an oscillating electronic detector element signal when the fringe pattern formed thereby moves across the first detector array. A signal processor generates a velocity signal corresponding to a first velocity component of movement of the object in the measurement volume in the longitudinal direction thereof based on the electronic detector element signals from each of the first detector elements.

31 Claims, 18 Drawing Sheets

(56) References Cited

U.S. PATENT DOCUMENTS

| | | | |
|---|---|---|---|
| 5,610,705 A * | 3/1997 | Brosnan et al. | 356/28.5 |
| 6,040,899 A * | 3/2000 | Breda | 356/28.5 |
| 2008/0043219 A1 | 2/2008 | Bivolaru et al. | |

OTHER PUBLICATIONS

International Preliminary Report on Patentability for PCT/EP2011/062239, mail date Nov. 7, 2012.

* cited by examiner

VECTOR VELOCIMETER

CROSS REFERENCE TO RELATED APPLICATIONS

This is the U.S. national phase application based on PCT Application No. PCT/EP2011/062239 filed Jul. 18, 2011, which is based on European Application No. 10172261.9 filed Aug. 9, 2010 and U.S. Provisional Application No. 61/371,830 filed Aug. 9, 2010, the entire contents of all of which are hereby incorporated by reference.

BACKGROUND

1. Field

The present invention relates to a compact, reliable and low-cost vector velocimeter for example for determining velocities of particles suspended in a gas or fluid flow, or for determining velocity, displacement, rotation, or vibration of a solid surface.

2. Description of the Related Art

LIDAR (Light Detection And Ranging) systems are well-known in the art. LIDAR determines velocity in the direction of line-of-sight based on detection of backscattered coherent light from airborne aerosols or particles in a measurement volume formed by a laser beam emitted by the LIDAR.

WO 2009/046717, which is hereby incorporated in its entirety by reference, discloses a LIDAR system with an all-semiconductor light source for emission of a laser beam for illumination of aerosols or particles in the measurement volume. The disclosed LIDAR system determines velocity magnitudes along the direction of propagation of the emitted laser beam. Possible velocity components in directions perpendicular to the direction of propagation of the emitted laser beam are not determined.

SUMMARY

Embodiments provide a vector velocimeter that is capable of determining a velocity vector, i.e. the magnitude of the velocity and the direction in one, two, or three dimensions, and which is compact, reliable and can be manufactured at low cost.

According to embodiments the above-mentioned and other features are obtained by provision of a vector velocimeter comprising a source of electromagnetic radiation that is arranged for emission of a measurement beam of electromagnetic radiation, e.g. spatially coherent light, directed towards a measurement volume for illumination of an object in the measurement volume.

According to embodiments a vector velocimeter is provided, wherein the vector velocimeter comprises a laser assembly for emission of a measurement beam for illumination of an object in a measurement volume with coherent light whereby a signal beam emanating from the object in the measurement volume is formed in response to illumination of the object by the measurement beam.

The vector velocimeter may further comprise a reference beam generator for generation of a reference beam. The vector velocimeter may be configured such that the reference beam and the measurement beam are emitted from the same laser source. The reference beam and the measurement beam may thereby be mutually coherent.

The vector velocimeter may further comprise a detector system comprising a first detector arrangement arranged in such a way that the signal beam and the reference beam are incident upon the first detector arrangement with the reference beam propagating at a first angle relative to a signal beam.

The first detector arrangement may comprise a first detector array of first detector elements, each of the first detector elements converting the intensity of the interfering signal beam and reference beam incident thereupon into a corresponding electronic detector element signal thereby generating an oscillating electronic detector element signal when the fringe pattern formed by the interfering signal beam and reference beam moves across the first detector array.

The vector velocimeter may further comprise a signal processor that is adapted for generation of a velocity signal corresponding to a first velocity component of movement of the object in the measurement volume in the longitudinal direction of the measurement volume based on the electronic detector element signals from each of the first detector elements.

The source of electromagnetic radiation may be a laser, such as a He—Ne laser or a semiconductor laser, e.g. included in a laser assembly, arranged for emission of the measurement beam.

The semiconductor laser may be a vertical external cavity surface-emitting laser (VECSEL) for emission of a high power beam. In a VECSEL, electromagnetic radiation is emitted perpendicular to the junction and the surface of the diode chip. The semiconductor chip or device, also denoted the gain chip, may contain a single semiconductor Bragg mirror and the active region (gain region) with typically several quantum wells (QWs). The device may have a total thickness of only a few micrometers. The laser resonator is completed with an external mirror.

The large transverse area of a VECSEL facilitates fundamental mode operation and leads to a high beam quality. Furthermore, the output beam of the VECSEL may be circular symmetrical with an insignificant amount of astigmatism leading to simple imaging properties.

The laser material in the electromagnetic cavity may be pumped optically. Optical pumping facilitates uniform pumping of large active areas. The optical pump source may for example be a high-brightness edge emitting broad-area diode or a diode laser bar. It is possible to achieve tens of watts of output power when pumping with a diode bar. Utilisation of an external resonator may facilitate provision of a diffraction-limited output.

The semiconductor laser may be a tapered semiconductor laser. Due to its tapered structure, the tapered semiconductor laser provides a high output power at its large area output facet, e.g. having a width of app. 250 µm, with a high beam quality since the ridge-waveguide at the narrow end, e.g. having a width of app. 3 µm, of the tapered laser forms a single mode spatial filter.

The vector velocimeter may furthermore comprise a semiconductor tapered power amplifier for amplification of the beam emitted by the semiconductor laser, for example the semiconductor laser and amplifier are of the semiconductor master-oscillator-power-amplifier (MOPA) type.

For example, a MOPA assembly may have a semiconductor master oscillator followed by a semiconductor tapered power amplifier; both realized on the same substrate constituting a cheap, rugged solution, ideal for industrial applications.

For example, an output power of approximately 1 Watt has been provided by a semiconductor MOPA assembly, even at a wavelength of 1.5 µm where the electron to photon conversion is less efficient as compared to the case for the 800 nm range. A wavelength of 1.5 µm or more is important for practical vector velocimeter use, since 1.5 µm is within the eye-safe region of the optical spectrum. The laser safety requirements during operation are more easily met when operated at eye-safe wavelengths.

Furthermore, the temporal coherency of tapered semiconductor laser assemblies, i.e. the coherence length, is sufficient for coherent vector velocimeter applications.

Still further, even though the spatial coherence of the output beam of a tapered semiconductor device is not perfect when compared to that of a diffraction-limited Gaussian beam, the laser assembly output beam is of sufficient quality to be used in a vector velocimeter. Spatial low-pass filtering of the output beam can remove or reduce the non-Gaussian spatial components that otherwise may lead to a reduced signal-to-noise ratio of the detector signal.

A vector velocimeter with a continuous wave (CW) coherent laser source of electromagnetic radiation relies on the focusing properties (the $M^2$ factor) of the laser to confine the actual measurement volume. The width of the measurement volume is confined by the diameter of the laser beam in the focused region (i.e. the confocal region). The length of the measurement volume along the beam axis is confined approximately by the Rayleigh length of the focused laser beam. For a CW vector velocimeter focused at a distance of one hundred meters from the system, the width of the measurement volume is typically in the order of one millimeter and the length of the measurement volume is in the order of ten meters depending on wavelength and focusing optics (the telescope). For pulsed systems the width of the measurement volume is the same as for the CW laser case, but the length of the measurement volume is given by the confocal parameter or the spatial length of the emitted pulse, whichever is the smallest.

The object in the measurement volume illuminated by the measurement beam may comprise one or more particles, molecules, atoms, or aerosols, such as water droplets, dust, etc., in the measurement volume, each of which scatters, diffracts, reflects, or refracts electromagnetic radiation in response to being illuminated by the measurement beam, thereby forming signal radiation emitted from the object in the measurement volume in response to the illumination by the measurement beam.

Throughout the present disclosure, the teen "particles" includes aerosols, molecules, atoms, dust, etc.

In the following, the part of the signal radiation that is received by a detector of the vector velocimeter is termed a signal beam.

The object in the measurement volume may also be an object of a size similar to the width of the measurement volume; or larger, and the surface of the object may scatter, diffract, reflect, or refract electromagnetic radiation in response to being illuminated by the measurement beam, thereby forming signal radiation emitted from the object in the measurement volume in response to the illumination by the measurement beam. Hereby, the vector velocimeter may determine the velocity of the surface of the object, or vibration, or rotation, of the object.

The vector velocimeter also has a reference beam generator that is arranged for emission of a reference beam of electromagnetic radiation at the wavelength of the measurement beam and propagating at an angle relative to the signal beam. The reference beam generator may for example be a beam splitter in which case the source of electromagnetic radiation also generates the reference beam.

In the vector velocimeter, the reference beam and the signal beam are arranged for interfering with each other at one or more detectors of the velocimeter.

Although the use of a collimated reference beam is envisaged, an arbitrary curvature of the reference beam might be useful. In this case, a given curvature will change the axial distance at which a given object will give the best signal. Thus, especially in case of measurement in the atmosphere, a change in reference beam curvature will facilitate the probing of various axial distances.

The vector velocimeter may in one or more embodiments comprise a detector system comprising a first detector arrangement with one or a plurality of detector arrays including a first detector array arranged in such a way that a signal beam emanating from the object together with the reference beam propagating at a first angle relative to the signal beam are incident directly upon a first detector array of first detector elements, wherein each of the first detector elements converts the intensity of the electromagnetic radiation incident thereupon into a corresponding electronic detector element signal. The operation of the detector array is explained in more detail below.

The vector velocimeter may in one or more embodiments comprise a detector system comprising a first detector arrangement with a first optical array of first optical elements arranged in such a way that a signal beam emanating from the object is incident upon the first optical array together with the reference beam propagating at a first angle relative to the signal beam, and wherein each of the first optical elements redirect the incident signal beam and reference beam towards a first detector array of first detector elements. Each of the first detector elements converts the intensity of the electromagnetic radiation incident thereupon into a corresponding electronic detector element signal. The operation of the optical array in cooperation with the detector array is explained in more detail below.

Utilizing a first optical array for directing the interfering signal beam and reference beam onto the first detector array allows one to focus the beams to a narrower area on the first detector elements thereby obtaining higher beam intensity at the first detector elements.

Due to the non-zero angle between the reference beam and the signal beam at the first detector arrangement in the detector system, and due to the fact that the reference beam and the signal beam are mutually coherent beams, an intensity fringe pattern is formed when the signal beam and the reference beam interfere and the intensity distribution of the interference pattern is detected.

More generally, the angle ($\theta$) may be related to the period ($\Lambda$) of the detector arrangement and the wavelength of the measurement beam ($\lambda$) as $\lambda/(2\Lambda)<\theta<2\lambda/\Lambda$. At angles below $\lambda/(2\Lambda)$, the fringe signal disappears, whereas for angles above $2\lambda/\Lambda$, the direction information is lost.

The period ($\Lambda$) of the detector arrangement in embodiments of the vector velocimeter where the signal beam and the reference beam are incident directly on the first detector array is the width of a detector array unit comprising 1, 2, 3, 4, 5 or more individual detector elements. Normally, the detector array unit comprises 2-4 detector elements.

The period ($\Lambda$) of the detector arrangement in embodiments of the vector velocimeter where the signal beam and the reference beam are incident on the first optical array is normally the width of an individual optical element.

The angle between signal beam and the reference beam may therefore be at least 1°, at least 2°, at least 3°, at least 4° or at least 5°. Suitable angle degrees may be between 1-10°.

The detected intensity fringe pattern is formed by alternating dark and bright lines as for example known from a Michelson type interferometer. The fringe distance is determined by the angle between the signal beam and the reference beam on incidence on the first detector arrangement.

Although the fringe pattern is a detected intensity pattern, for example by the eye for visible wavelengths of radiation, the term "fringe pattern" as used throughout the present disclosure, includes the electromagnetic field in a certain area or volume that would cause a fringe pattern of intensity variations to be detected in the event that a detector was positioned in the area or volume of the electromagnetic field in question.

When an object, such as particles, aerosols, a solid surface, etc., moves in the measurement volume in the direction of propagation of the measurement beam, the Doppler effect causes a corresponding movement of the fringe pattern formed by the signal beam and the reference beam in a direction perpendicular to the alternating dark and bright lines of the fringe pattern. Movement in the opposite direction in the measurement volume also leads to movement of the fringe pattern in the opposite direction.

In embodiments of the vector velocimeter where the signal beam and the reference beam are incident directly on the first detector array of the first detector arrangement with a first angle between the signal beam and reference beam, the first detector array are utilized directly for detection of movement of the fringe pattern formed at the first detection array by interference between the signal beam and the reference beam at the first detector array. Each of the first detector elements generates an oscillating electronic detector element signal in response to a fringe pattern moving across the first detector array. Thus, the first detector array is arranged so that the signal beam and reference beam are incident on the first detector array of first detector elements, each of the first detector elements converting intensity of radiation incident thereupon into a corresponding electronic detector element signal. When the fringe pattern of the interfering signal beam and reference beam move across the first detector array, each of the electronic detector element signals will oscillate due to the movement of the fringe pattern on the first detector elements.

In embodiments of the vector velocimeter comprising a first detector arrangement with a first optical array and a first detector array, the first optical array of first optical elements in cooperation with the first detector array are utilized for detection of movement of the fringe pattern formed at the input plane directly in front of the first optical array by interference between the signal beam and the reference beam. A moving fringe pattern is redirected repetitively by the first optical elements towards the first detector array of first detector elements so that each of the first detector elements generates an oscillating electronic detector element signal in response to a fringe pattern moving across the first optical array. Thus, the first optical array and the first detector array are arranged so that the signal beam and reference beam are incident on the first optical elements at a first non-zero angle and redirected by the first optical elements towards the first detector array of first detector elements, each of the first detector elements converting intensity of radiation incident thereupon into a corresponding electronic detector element signal. When the fringe pattern of the interfering signal beam and reference beam move across the first optical array, each of the electronic detector element signals will oscillate due to the repeated redirection of the fringe pattern towards each of the first detector elements.

Further, the vector velocimeter has a signal processor that is configured for generation of a velocity signal corresponding to the velocity of movement of the fringe pattern across the first optical array based on the electronic detector element signals, for example the frequency or other signal properties of the detector element signals. The fringe pattern velocity corresponds to a first velocity component of movement of the object in the measurement volume in the longitudinal direction of the measurement volume.

For example in a vector velocimeter wherein the measurement beam and the signal beam propagate along the same path, but in opposite directions, the longitudinal direction of the measurement volume coincides with the direction of propagation of the measurement beam (and the signal beam), and thus the velocity component determined by determination of fringe pattern movement as described above, is the velocity component of object movement in the direction of propagation of the measurement beam. When direction of fringe pattern movement is determined, the direction of object movement along the direction of propagation of the measurement beam is also determined.

In a vector velocimeter wherein the signal beam propagates in a direction that forms an angle with the direction of propagation of the measurement beam, the fringe distance is still determined by the angle between the reference beam and the signal beam at the detector array in question, but the measurement volume is formed in cooperation by the transmitter optics transmitting the measurement beam towards the measurement volume and the receiver optics receiving the signal beam emitted from the measurement volume so that the longitudinal direction of the measurement volume in this case does not coincide with the direction of propagation of the measurement beam. Instead, the longitudinal direction of the measurement volume forms an angle with the measurement beam and also with the signal beam. This angle is half the angle formed between the measurement beam and the signal beam, and extends in a plane defined by the measurement beam and the signal beam.

Thus, in this case, the direction of maximum Doppler shift does not coincide with the direction of propagation of the measurement beam. Instead, the direction of maximum Doppler shift forms an angle with the measurement beam, and also with the signal beam, which is half the angle between the measurement beam and the signal beam and extends in a plane defined by the measurement beam and the signal beam.

When, the measurement beam illuminates more than one particle or a large object with a rough surface in the measurement volume speckles can be formed in addition to the fringe pattern.

If the receiver optics can resolve objects with a size less than the cross-section of the measurement volume in a plane perpendicular to the signal beam then speckles are formed.

Like "fringe pattern", speckle pattern is a pattern of intensity variations as detected by a detector. For example, when a surface is illuminated with visible laser light, speckles may be observed by the human eye. The speckle pattern appears as a grainy intensity pattern when the intensity is detected, e.g. by the human eye. Surface roughness of the object causes formation of the speckle pattern since surface deviations modify the phase of various parts of the incident electromagnetic field differently, and produces the speckle pattern by mutual interference of various parts of the electromagnetic field as received by the detector.

Like the term "fringe pattern", throughout the present disclosure, the term "speckle pattern" also includes the electromagnetic field that would cause detection of a speckle pattern (of intensity) with an intensity detector.

When the object moves in the measurement volume in a direction in a plane substantially perpendicular to the signal beam, the speckle pattern in the measurement volume as detected with an intensity detector in a position where a signal beam can be received, moves across the surface of the detector with a velocity and direction corresponding to the velocity and direction of the object in the measurement volume in a direction in a plane substantially perpendicular to the signal beam.

In embodiments of the vector velocimeter with a detector system where the signal beam and the reference beam are incident directly on the first detector array of the first detector arrangement, a second detector arrangement comprising a second detector array of second detector elements may be included into the vector velocimeter, wherein each of the second detector elements converts the intensity of the signal beam (and possibly the reference beam) incident thereupon into a corresponding electronic detector element signal thereby generating an oscillating electronic detector element signal when the speckle pattern formed by the signal beam moves across the second optical array. The reference beam may be overlapped with the signal beam on incidence on the second detector array in order to amplify the intensity of the speckles pattern, but it is not a requirement in order to obtain a speckles pattern. The signal beam and the reference beam may further be incident on the second detector array at an angle.

In embodiments of the vector velocimeter comprising a first detector arrangement with a first optical array and a first detector array, a second detector arrangement comprising a second detector array of second detector elements and a second optical array of second optical elements may be included into the detector system. The second optical array is arranged in such a way that the signal beam is incident upon the second optical array, wherein each of the second optical elements redirects the incident signal beam (and possibly the reference beam) towards the second detector array arranged so that the redirected signal beam from the second optical elements are incident upon the second detector array. Each of the second detector elements converts the intensity of the beam(s) incident thereupon into a corresponding electronic detector element signal thereby generating an oscillating electronic detector element signal when the speckle pattern formed by the signal beam at incidence upon the second optical elements of the second optical array moves across the second optical array. The reference beam may be arranged such that the signal beam and the reference beam overlap and interact when the beams are incident on the second optical array in order to amplify the intensity of the speckles pattern, but it is not a requirement in order to obtain a speckles pattern. The signal beam and the reference beam may be incident on the second optical array at an angle.

Other embodiments of the vector velocimeter incorporate a mixture of the two detector arrangements described above. Thus, a first detector arrangement comprising a first optical array in combination with a first detector array may be used for the detection of the first velocity component and a second detector arrangement wherein the signal beam and the reference beam are incident directly on the second detector array of the second detector arrangement may be used for the detection of the second velocity component. The first and the second detector arrangements may also be interchanged for the detection of the first and the second velocity component, respectively.

The signal processor of the velocimeter is adapted for generation of a velocity signal corresponding to a second velocity component of movement of the object in the measurement volume based on the electronic detector element signals from each of the second detector elements. The second velocity component is substantially perpendicular to the first velocity component.

In order to determine a third velocity component in a direction in a plane substantially perpendicular to the measurement beam, for example perpendicular to the second velocity component, the detector system of the vector velocimeter may further comprise a third detector arrangement comprising a third detector array of third detector elements, wherein each of the third detector elements converts the intensity of the signal beam (and possibly the reference beam) incident thereupon into a corresponding electronic detector element signal thereby generating an oscillating electronic detector element signal when the speckle pattern formed by the signal beam moves across the third detector array. The reference beam may be arranged such that the signal beam and the reference beam overlap and interact when the beams are incident on the third detector array in order to amplify the intensity of the speckles pattern. The signal beam and the reference beam may be incident on the third detector array at an angle, but it is not a requirement in order to obtain a speckles pattern.

The third detector arrangement may further comprise a third optical array of third optical elements arranged in such a way that the signal beam is incident upon the third optical array, wherein each of the third optical elements redirects the incident signal beam (and possibly the reference beam) towards the third detector array of third detector elements arranged so that the redirected signal beam from the third optical elements are incident upon the third detector array. Each of the third detector elements converts the intensity of the beam(s) incident thereupon into a corresponding electronic detector element signal thereby generating an oscillating electronic detector element signal when the speckle pattern formed by the signal beam at incidence upon the third optical elements of the third optical array moves across the third optical array. The reference beam may be arranged such that the signal beam and the reference beam overlap and interact when the beams are incident on the third optical array in order to amplify the intensity of the speckles pattern, but it is not a requirement in order to obtain a speckles pattern. The signal beam and the reference beam may be incident on the third optical array at an angle.

The signal processor is adapted for generation of a velocity signal corresponding to a third velocity component of movement of the object in the measurement volume based on the electronic detector element signals from each of the third detector elements. The third velocity component is substantially perpendicular to the first velocity component.

The first and second optical arrays may be integrated into a single optical array.

The first and third optical arrays may be integrated into a single optical array.

The second and third optical arrays may be integrated into a single optical array.

The first and second and third optical arrays may be integrated into a single optical array.

The first and second detector arrays may be integrated into a single detector array.

The first and third detector arrays may be integrated into a single detector array.

The second and third detector arrays may be integrated into a single detector array.

The first and second and third detector arrays may be integrated into a single detector array.

Examples of optical arrays and detector arrays are disclosed in WO 03/069278, which is hereby incorporated in its entirety by reference.

An optical array may comprise at least three optical elements for mapping of different specific areas of the measurement volume onto substantially the same area of the corresponding detector in space thereby generating an oscillating electronic detector signal caused by phase variations of light emanating from the object moving in the measurement volume. For example, the first optical array may comprise at least three first optical elements. The second optical array may comprise at least three second optical elements and/or the third optical array may comprise at least three third optical elements. Accordingly, each of the first, second and third optical arrays may have at least three first, second, and third optical elements, respectively, for mapping of different specific areas of the measurement volume onto substantially the same area of the first, second, and third optical detectors, respectively, in space thereby generating an oscillating electronic detector signal caused by phase variations of light emanating from the object moving in the measurement volume.

In embodiments of the velocimeter where detector system is such that the signal beam and the reference beam are incident directly on the detector array(s), the formation of an oscillating optical signal emitted by an illuminated moving object can be obtained by 1) Illuminating the object moving in the measurement volume with the measurement beam and allowing electromagnetic radiation emitted by the object in response to the illumination to interfere with the reference beam whereby a moving fringe pattern is formed when movement of the object has a velocity component in the direction of propagation of the measurement beam. The first detector array is positioned so that the moving fringe pattern moves across the first detector array thereby generating an oscillating electronic signal in response to the incident electromagnetic radiation, and in vector velocimeters with second and/or third optical arrays by:

2) Illuminating the object moving in the measurement volume with the measurement beam whereby speckles are formed that move when the object has a velocity component perpendicular to the direction of propagation of the signal beam. The second and third optical arrays are positioned so that the moving speckles move across the second and third detector arrays, respectively, thereby generating respective oscillating electronic signals in response to the incident electromagnetic radiation, respectively.

The direction of the velocity component determined by each of the first, second, and third detector arrays in the embodiment of the vector velocimeter where the signal beam and the reference beam are incident directly on the detector arrays is determined by the orientation of the detector array in question.

In embodiments of the detector system, wherein the detector arrangements comprise optical arrays, the repetitive optical structure of the optical arrays is utilized for formation of an oscillating optical signal emitted by an illuminated moving object by 1) Illuminating the object moving in the measurement volume with the measurement beam and allowing electromagnetic radiation emitted by the object in response to the illumination to interfere with the reference beam whereby a moving fringe pattern is formed when movement of the object has a velocity component in the direction of propagation of the measurement beam. The first optical array is positioned so that the moving fringe pattern moves across the repetitive optical structure of the first optical array and is redirected repetitively onto the first detector array that generates an oscillating electronic signal in response to the incident electromagnetic radiation from the first optical array, and in vector velocimeters with second and/or third optical arrays by:

2) Illuminating the object moving in the measurement volume with the measurement beam whereby speckles are formed that move when the object has a velocity component perpendicular to the direction of propagation of the signal beam. The second and third optical arrays are positioned so that the moving speckles move across the repetitive optical structure of the second and third optical arrays, respectively, and are redirected repetitively onto the second and third detector arrays, respectively, that generate respective oscillating electronic signals in response to the incident electromagnetic radiation from the second and third optical arrays, respectively.

The direction of the velocity components determined by each of the first, second, and third optical arrays is determined by the orientation of the optical array in question in cooperation with the orientation with the corresponding detector array, i.e. the direction between neighbouring optical elements and neighbouring detector elements, respectively.

The optical array may for example comprise a linear array of cylindrical lenses. The focal length of the lenses may be positive or negative. For the sake of explanation, the input plane may be defined in front of the array of lenses, e.g., at a distance equal to the focal length of the lenses and perpendicular to the direction of propagation of the incoming electromagnetic radiation.

The fringe pattern is formed at the input plane when the overlapping reference beam and signal beam interact. The speckle pattern and/or the fringe pattern can be detected at the input plane, e.g. by intensity measurements, caused by variations of the electromagnetic field along the input plane.

When the object moves in the measurement volume, the speckle pattern and/or the fringe pattern move across the input plane with a velocity proportional to the velocity of the object in the measurement volume in the direction of movement corresponding to the orientation of the optical array, i.e. the direction perpendicular to the direction of length of the cylindrical lenses. Each of the individual optical elements, in this example constituted by cylindrical lenses, directs the incoming electromagnetic radiation towards a detector array of detector elements. The electromagnetic radiation that is redirected by the individual optical elements sweeps across the detector array, when the speckle pattern or fringe pattern moves a distance that is equal to the width of an individual optical element across the input plane. This is repeated for each optical element when the speckle pattern or fringe pattern travels across the input plane, and when the pattern has traversed a distance equal to the length of the optical array, i.e. across all of the cylindrical lenses in this example, the redirected electronic radiation has been swept repetitively across the detector array. The average number of sweeps is equal to the number of individual optical elements of the linear array passed by the moving fringe pattern, or, moving speckle pattern during the time it takes the speckle pattern to either decorrelate or to move across the entire optical array. The repeated sweeps cause generation of an oscillating electronic signal by each of the detector elements.

Preferably, the width of the individual optical elements is matched to the fringe distance in the fringe pattern or to approximately 2-3 times the width of individual speckles in the speckle pattern at the input plane in order to generate an electronic detector signal with a large signal to noise ratio. The width of the individual optical elements is determined so that the intensity of the electromagnetic field at a detector element varies between a high intensity when high amplitude parts of the fringe pattern or speckle pattern are aligned with the optical elements and a low intensity when low amplitude parts of the fringe pattern or speckle pattern are aligned with the optical elements.

When a fringe pattern and a speckle pattern both move across the input plane of an optical array, the fringe pattern is preferably arranged with a fringe distance that is significantly different from a characteristic size of the speckles so that the velocity components can be separated by spatial filtering velocimetry, i.e. the velocity component of the fringe pattern can be determined with an optical array with a certain pitch, and the velocity component of the fringe pattern can be determined with an optical array with a different pitch. The pitch or period of an optical array is the distance between individual neighbouring optical elements, e.g. for an array of identical cylindrical lenses, the pitch equals the width of the individual cylindrical lenses.

The frequency of the oscillations of the electronic detector element signal corresponds to the velocity of displacement of the fringe pattern or speckle pattern across the input plane in the direction defined by neighbouring optical elements in cooperation with the direction defined by neighbouring detector elements, divided by the array pitch, i.e. the distance between individual neighbouring optical elements in the direction in question. For an array of cylindrical lenses, the direction is perpendicular to the direction of length of the individual cylindrical lenses, and the orientation of the detector array defined by the direction between neighbouring individual detector elements is aligned with the direction perpendicular to the direction of length of the individual cylindrical lenses.

This principle of operation applies in general to any type of optical array utilized and regardless of whether or not an image of the object in the measurement volume is formed at the input plane or directly at the optical array.

Two-dimensional speckle pattern displacement may be determined with a two-dimensional array of optical elements, e.g. circular lenticular lenses, arranged along perpendicular directions of the array and cooperating with a two-dimensional detector array aligned with the two-dimensional optical array.

The vector velocity meter may further comprise an imaging system, e.g. a lens, for imaging part of the input plane onto the detector elements whereby each of the individual optical elements in combination with the imaging system images specific parts of the input plane onto the same specific area of the detector array. Hereby, points at the input plane that are positioned at the same relative positions in relation to adjacent respective optical elements will be imaged onto the same point of the detector array, whereby the signal-to-noise ratio may be improved. Without the imaging system, there will be a small distance between mapped points at the detector array for corresponding points at the input plane having the same relative position in relation to respective neighbouring optical elements. However, the accuracy of the system may still be sufficient and will depend on the actual size of the system.

The optical array and the imaging system may be merged into a single physical component, such as a moulded plastic component, in order to obtain a further compact system suited for mass production.

The individual optical elements of the optical arrays may interact with light by reflection, refraction, scattering, diffraction, etc, either alone or in any combination, of light incident upon them. Thus, the individual optical elements may be lenses, such as cylindrical lenses, spherical lenses, Fresnel lenses, ball lenses, or phase gratings, amplitude gratings, diffractive gratings, Ronchi rulings, prisms, prism stubs, mirrors, liquid crystals, etc.

The optical array may further be formed by a diffractive optical element, such as holographically produced lenses, etc.

Still further, the optical array may comprise a linear phase grating with a sinusoidal modulation of the film thickness, e.g. in a photo resist film.

In the vector velocimeter, the electronic signals output from the individual detector elements from each of the detector arrays may be combined in order to suppress undesired signal components in the electronic signal output from the detector array in question as also disclosed in WO 03/069278, whereby signal detection is simplified. For example, subtraction may be used to suppress the pedestal of the signal, i.e. a low frequency part of the electronic signal, and also harmonics in the electronic output signal may be suppressed.

Also, the direction of movement of the fringe pattern or speckle pattern may be determined by suitable arrangement of the detector array elements in combination with suitable signal processing, e.g. whereby a quadrature, or substantially quadrature, signal may be obtained, thereby simplifying detection of direction as for example compared to conventional LDA (Laser Doppler Anemometer) or LIDAR systems.

Occurrence of velocity signal drop out may be reduced by provision of a second set of optical detector elements that is displaced in relation to the existing set of detector elements so that a signal that is statistically independent of the other signal may be available from one set of detector elements during absence of a signal from the other set of detector elements. Thus by proper processing of the two signals, e.g. switching to a set of detector elements generating a velocity signal, occurrence of signal drop out is minimized.

It is an important advantage of the vector velocimeter that formation of a fringe pattern by the non-zero angle between the reference beam and the signal beam makes it possible to utilize a compact electro-optical device with the first optical array and the first detector array for determination of movement of the fringe pattern and thereby the corresponding velocity of the object in the measurement volume including the direction of the velocity. Furthermore, optical arrays cooperating with respective further detector arrays can be added for determination of speckle movement in one or two dimensions whereby two-dimensional and three-dimensional velocity of the object may be determined.

For embodiments of the vector velocimeter where the signal beam and the reference beam are incident directly on the detector array, the non-zero angle between the reference beam and the signal beam makes it possible to utilize the even more compact detector scheme for determination of movement of the fringe pattern and thereby the corresponding velocity of the object in the measurement volume including the direction of the velocity directly on the detector array.

Furthermore, additional detector arrays can be added for determination of speckle movement in one or two dimensions whereby two-dimensional and three-dimensional velocity of the object may be determined.

Even further, the utilization of a combined detector array allowing for detection of two or three velocity components by the same detector array makes the velocimeter even more compact.

For all embodiments of the vector velocimeter, this makes the one-dimensional, two-dimensional, or three-dimensional vector velocimeter simple, robust, compact and easy to manufacture.

BRIEF DESCRIPTION OF THE DRAWINGS

The above and other features and advantages of the vector velocimeter will become readily apparent to those skilled in the art by the following detailed description of exemplary vector velocimeters with reference to the attached drawings, in which:

FIG. 11 is a plot of the output signal provided by the detector circuit shown in

DETAILED DESCRIPTION

Figure 1:
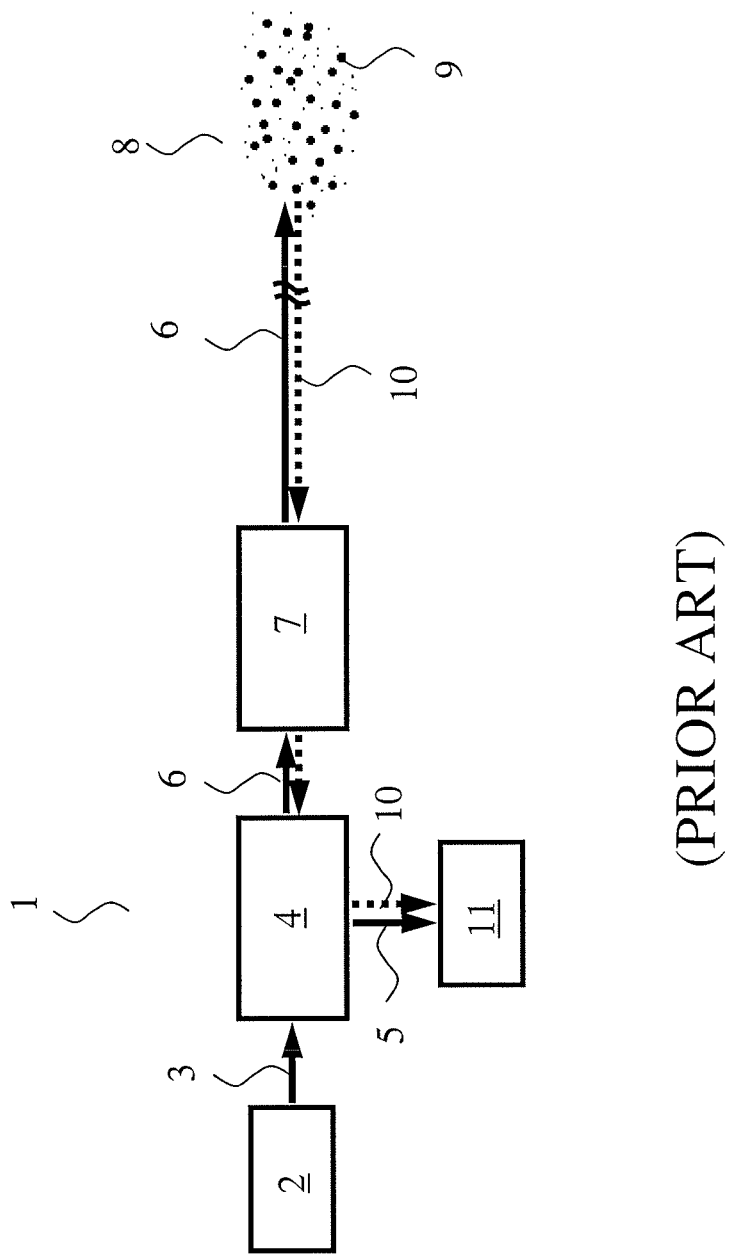
FIG. 1 schematically illustrates a conventional LIDAR system.

The figures are schematic and simplified for clarity, and they merely show details which are important to the understanding of the operation of the vector velocimeter including non-essential features that may have many alternatives. For simplicity, details that are well-known to the person skilled in the art may have been left out. Throughout, the same reference numerals are used for identical or corresponding parts.

In addition to the exemplary vector velocimeters described more fully hereinafter with reference to the accompanying drawings, the principles of the vector velocimeter may also be applied in further different ways and should not be construed as limited to the examples set forth herein. Rather, these exemplary vector velocimeters are provided so that this disclosure will be thorough and complete, and will fully convey the concept of the vector velocimeter to those skilled in the art.

FIG. 1 schematically illustrates a conventional LIDAR system 1. A laser 2 emits a first coherent light beam 3 of high spatial and spectral beam quality. A beam splitter 4 divides the emitted light beam 3 into a reference beam 5 and a measurement beam 6, and imaging optics 7 focuses the measurement beam 6 at the measurement volume 8. The imaging optics 7 may be a Galilean or Keplerian telescope. When the object 9 constituted by aerosols in the measurement volume 8 are illuminated by the measurement beam 6, the aerosols back scatter a small amount of light forming a signal beam 10 towards the LIDAR detector 11. For aerosols, the intensity of the back scattered signal beam 10 is in the order of 1 pW when illuminated by a measurement beam 6 of 1 W.

The signal beam 10 propagates through the imaging optics 7 and is redirected by the beam splitter 4 towards the optoelectronic detector 11 on the surface of which, the signal beam 10 interferes with the reference beam 5 and is mixed with the reference beam 5 in the opto-electronic detector 11 so that the opto-electronic detector 11 outputs an a measurement signal containing spectral components corresponding to the difference frequency between the reference beam 5 and the signal beam 10. The difference frequency corresponds to Doppler frequency of the moving aerosols 9 in measurement volume 8 relatively to the LIDAR system. By processing the measurement signal using a signal processor, the corresponding speed of the aerosols in the direction of propagation of the measurement beam 6 can be calculated.

In the conventional LIDAR shown in FIG. 1, the direction of movement of the aerosols 9 along the direction of propagation of the measurement beam 6 is not determined, i.e. the same speed will be measured for aerosols moving with the same speed, but in opposite directions along the direction of propagation of the measurement volume.

Complex and expensive components have to be added to the illustrated LIDAR for provision of determination of the direction of movement of the aerosols, for example frequency shifting components, such as a Bragg-cell, shifting the frequency of the measurement beam 6 or the reference beam 5.

In the vector velocimeter, this problem is solved in a simple and cost effective way.

The vector velocimeter also provides determination of two-dimensional or three-dimensional velocity vectors.

Figure 2:
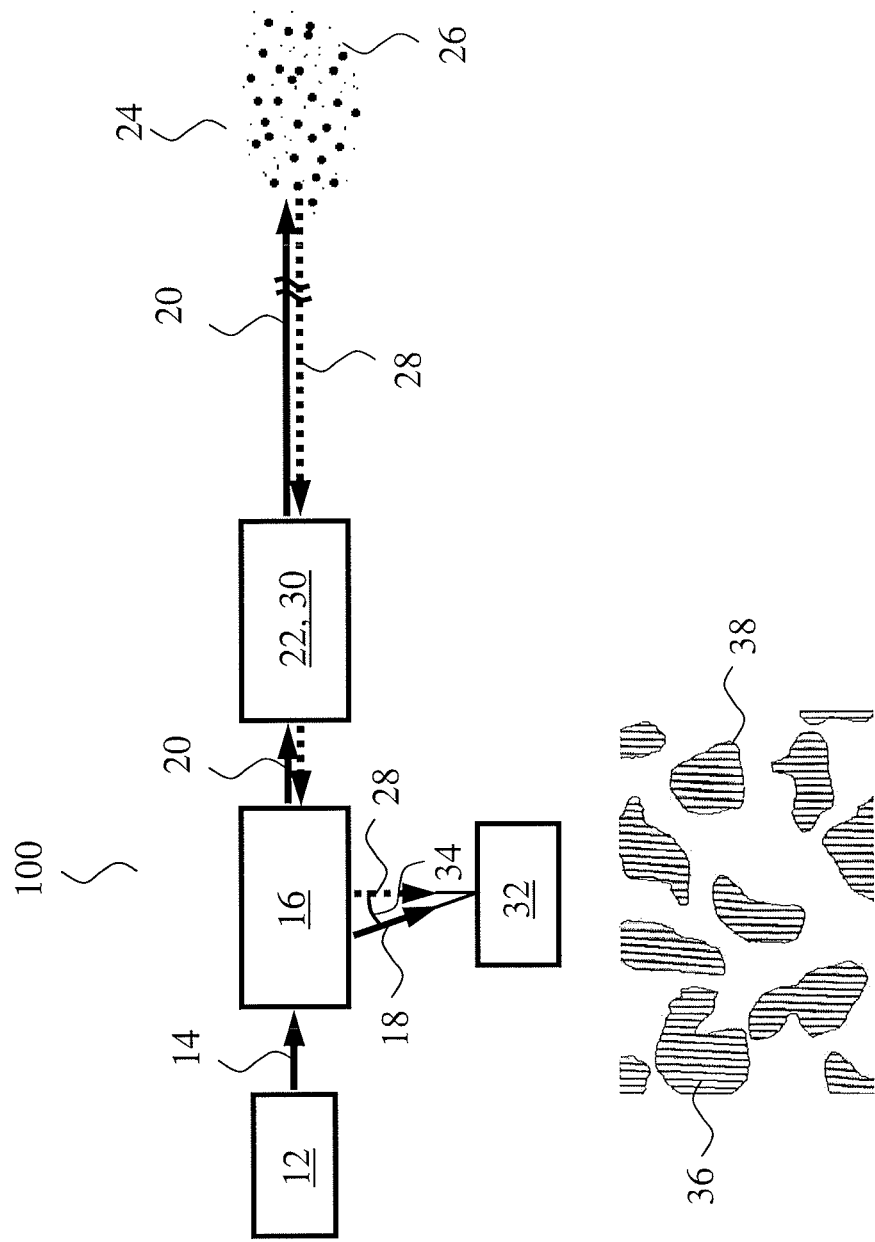
FIG. 2 schematically illustrates a vector velocimeter according to the invention, FIG. 3 schematically illustrates the operation of an optical array in cooperation with a detector array.

FIG. 2 schematically illustrates a vector velocimeter 100 in which the reference beam 18 and the signal beam 28 are incident on the detector system 32 forming a non-zero angle 34, contrary to the conventional LIDAR 1 shown in FIG. 1 wherein the reference beam 5 and the signal beam 10 propagate along the same path and are incident on the detector 11 at an angle of 0 degrees.

The angle ($\theta$) 34 may be related to the wavelength of the measurement beam ($\kappa$) and the period ($\Lambda$) of one or more detector arrangements 33 included in the detector system 32 as $\lambda/(2\Lambda)<\theta<2\lambda/\Lambda$. At angles below $\lambda/(2\Lambda)$, the fringe signal disappears, whereas for angles above $2\lambda/\Lambda$, the direction information is lost.

The angle 34 may in one or embodiments be at least 1°, at least 2°, at least 3°, at least 4° or at least 5°. An angle 34 of e.g. 3.3° corresponds to a fringe distance of 15 μm at a wavelength of 850 nm. Suitable angle 34 degrees may be between 1-10°. However, as apparent from the above relation, suitable angle ranges are dependent on the wavelength of the measurement beam 20.

A laser in a laser assembly 12, for example as disclosed in WO 2009/046717 A2, emits a first coherent light beam 14 of high spatial and spectral beam quality. A beam splitter 16 divides the emitted light beam 14 into a reference beam 18 and a measurement beam 20, and an optical transmitter 22 focuses the measurement beam 20 at the measurement volume 24. The optical transmitter 22 may be a Galilean or Keplerian telescope. When the object 26, in the illustrated example constituted by aerosols 26, in the measurement volume 24 are illuminated by the measurement beam 20, the aerosols back scatter a small amount of light forming a signal beam 28 towards an optical receiver 30 that images the measurement volume 24 onto one or more detector arrangements 33 in the detector system 32, the operation of which is further explained below.

The angle 34 between the reference beam 18 and signal beam 28 incident at the detector system 32 comprising one or more detector arrangements 33 leads to formation of a fringe pattern 36 of intensity variations overlaying a speckle pattern 38 that is formed by illumination of the object 26 in the measurement volume 24 by the measurement beam 20. The combined fringe pattern 36 and speckle pattern 38 is illustrated to the right in FIG. 2 showing the intensity pattern as it could be detected at the surface of a detector arrangement 33 in the detector system 32. The fringe distance is determined by the angle 34.

The longitudinal direction of the measurement beam is equal to the common direction of propagation of the measurement beam and the signal beam. When the object moves in the direction of propagation of the measurement beam 20, the fringe pattern 36 shown in FIG. 2 moves in the speckle pattern 38 to the left or right, i.e. perpendicular to the direction of the individual fringes, as determined by the direction of movement of the object in the direction of propagation of the measurement beam 20. Thus, both speed and direction can be determined.

In case the object 26 moves in the transverse direction, i.e. in a direction perpendicular to the direction of propagation of the measurement beam 20, the fringe pattern 36 does not move while the speckle pattern 38 will move accordingly following the movement of the object.

In case, the velocity of the object does not have components perpendicular to the direction of propagation of the measurement beam 20, the speckle pattern 38 will remain in its current position; however, the statistics of phase changes of the signal beam may lead to changed occurrence of speckles also known as "speckle boiling".

The possible movement of the fringe pattern 36 and of the speckle pattern 38 is determined by the detector system 32 comprising one or more detector arrangements 33, the operation of which is further explained below, whereby the velocity of the object including the direction of the object may be determined in one, two or three dimensions.

Figure 3:
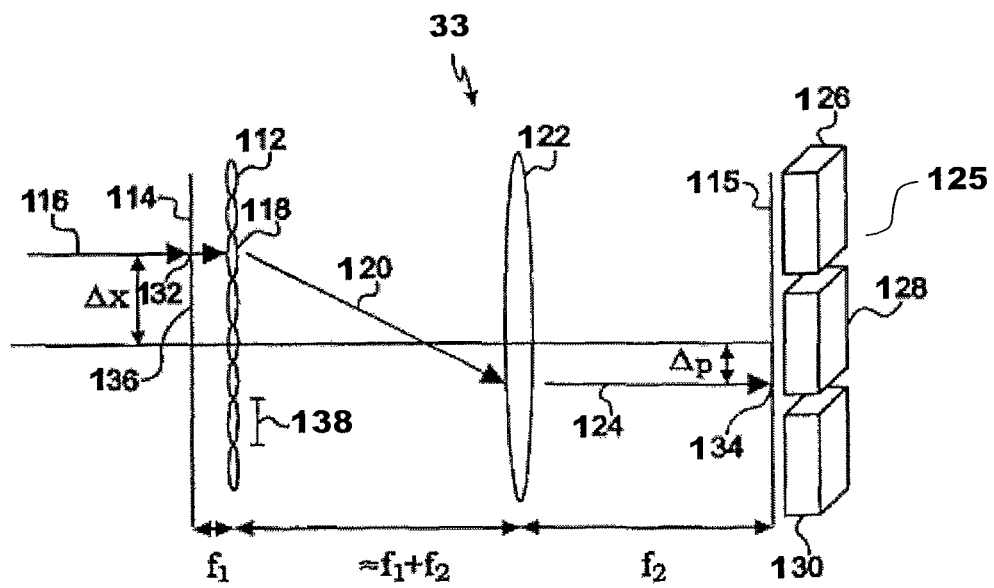

FIG. 3 schematically illustrates the operation of a detector arrangement 33 comprising an optical array 112 and a detector array 125 with detector elements 126, 128, 130. In the illustrated example, the optical array 112 is a linear array 112 of substantially identical cylindrical lenses 118. $f_1$ is the focal length of the cylindrical lenses 118. For the sake of explanation, an input plane 114 is defined at a distance equal to the focal length $f_1$ of the lenses 118 and perpendicular to the direction 116 of propagation of the incoming light 18, 28.

When the object is displaced in the measurement volume (not shown), the intensity pattern in question, i.e. the speckle pattern 38 and/or the fringe pattern 36, moves correspondingly along the input plane 114. The individual cylindrical lenses 118 redirect the light 18, 28 towards a refractive lens 122 having a focal length $f_2$ and being positioned a distance equal to $f_1+f_2$ from the linear array 112. The lens 122 further refracts the redirected light 120 into light 124 propagating towards detector array 125 having detector elements 126, 128, and 130 positioned at the focal plane of lens 122. In this way, each of the individual lenses 118 of the optical array 112 in combination with lens 122 images the input plane 114 onto the same area of an output plane 115. The detector elements 126, 128, 130 of the detector array 125 are positioned so that their individual surfaces for reception of light coincide with the output plane 115.

Thus, an area 132 of the input plane is imaged by a respective adjacent lens 118 onto an area 134 of a detector element 128 and corresponding areas 136 that are located at the same relative positions in relation to other respective adjacent cylindrical lenses 118 are imaged onto the same area 134 of the detector element 128.

It should be noted that the distance between the linear array 112 and the lens 122 is chosen to be equal to $f_1+f_2$ in the present example for ease of explanation of the operation of the detector arrangement 33. However, the detector arrangement 33 operates with any distance between the linear array 112 and the lens 122. For compactness it may be preferred to set the distance to zero.

Thus, when an intensity feature at the input plane 114 has moved a distance 138 that is equal to the width $\Lambda_0$, i.e. the pitch, of an individual optical element 118, the corresponding image formed by the combination of lens 122 and the respective cylindrical lens 118 sweeps across the area of the detector array 125 with detector elements 126, 128, and 130. This is repeated for the other cylindrical lenses 118, and it is seen that when an intensity feature has traversed a number of individual cylindrical lenses 118 of the linear array 112, the detector elements 126, 128, 130 are swept repetitively a number of times equal to the number of individual cylindrical lenses 118 the intensity feature has passed. It is seen that for a regular intensity pattern at the input plane, the width of the individual optical elements, in the illustrated example cylindrical lenses 118, can be matched to the size of features of the intensity pattern, such as fringe distance or speckle size, for optimization of the signal to noise ratio of the output signal.

Furthermore, the optical array 112 is preferably aligned with the desired direction of movement to be determined. Thus, if the detector arrangement 33 shown in FIG. 3 is used for determination of the velocity of the fringe pattern 36, the optical array 112 is preferably positioned so that its longitudinal direction is perpendicular to the fringe pattern movement and the size of the individual optical elements 118 is matched to the fringe distance. Likewise, if the detector arrangement 33 is used for determination of the velocity of the speckle pattern 38 in a certain direction, the optical array 112 is preferably positioned so that its longitudinal direction is aligned perpendicular to the desired direction of speckle pattern movement and the size of the individual optical elements 118 is matched to approximately 2-5 times the speckle size. If the detector arrangement 33 is used for determination of the velocity of both the fringe pattern 36 and the speckle pattern 38 in e.g. the same direction the system is designed so that the speckle size is an order of magnitude larger than the fringe distance. In this way, fringe pattern movement and speckle pattern movement in various directions can be separated by spatial filtering velocimetry provided by the optical array 112.

The frequency of the signal generated by each of the detector elements 126, 128, 130 corresponds to the velocity of the intensity pattern in question in the direction Δx along the length of the linear optical array 112 divided by the array pitch, i.e. the distance between individual neighbouring optical elements.

The lens 122 is not required in the detector arrangement 33. In a detector arrangement 33 without the lens 122, the individual mappings of the input plane 114 onto the output plane 115 by the individual optical elements 118 of the optical array 112 will be displaced slightly with respect to each other. The amount of displacement depends on the size of the detector arrangement 33; however, the assembly still operates substantially according to the principles explained above.

The same principle of operation applies in general to other detector arrangements 33 regardless of the type of optical element utilized and regardless of whether or not an image of the object is formed at the input plane 114.

Figure 4:
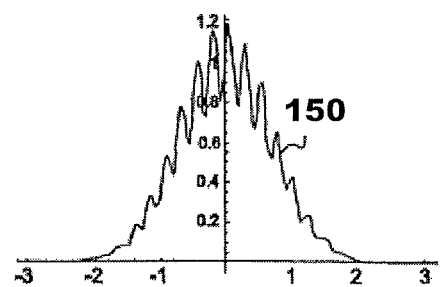
FIG. 4 is a plot of a detector element signal from the detector array shown in FIG. 3.
Figure 5:
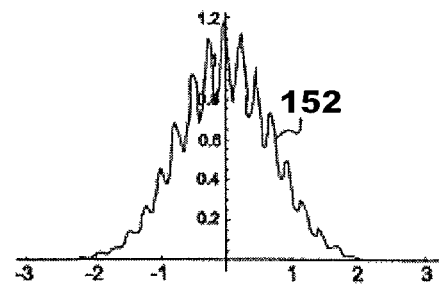
FIG. 5 is a plot of a signal from a displaced optical detector element having a phase lag in relation to the signal shown in FIG. 4.
Figure 6:
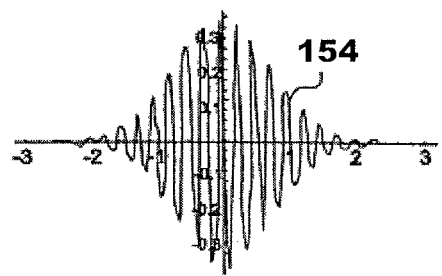
FIG. 6 is a plot of the difference between the signals shown in FIGS. 4 and 5, FIG. 7 schematically illustrates a simple detector circuit with subtraction of detector element signals.

FIG. 4 is a plot of the output signal 150 from one of the detector elements 126, 128, 130 shown in FIG. 3. A corresponding signal 152 from an adjacent detector element is shown in FIG. 5. This signal 152 is phase shifted in relation to the signal 150 shown in FIG. 4 because of the physical displacement of the detector elements 126, 128, 130. Since the low frequency pedestals of the two signals 150, 152 are substantially identical, the difference between the two signals 150, 152 is an AC-signal 154 as shown in FIG. 6.

Figure 7:
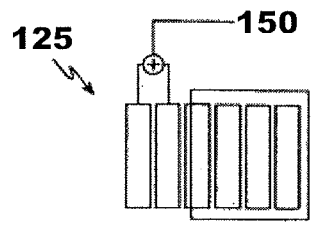
Figure 8:
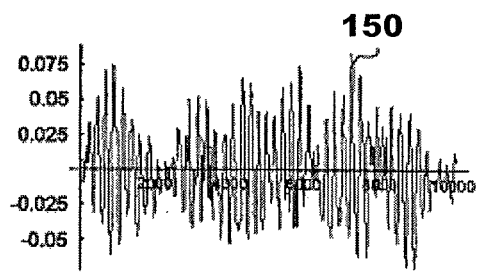
FIG. 8 is a plot of the output signal provided by the detector circuit shown in FIG. 7.
Figure 9:
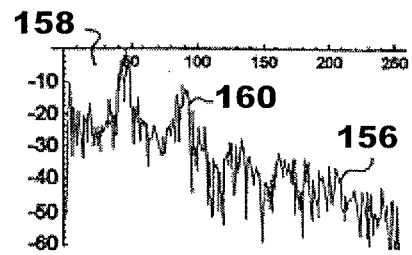
FIG. 9 is a plot of the power spectrum of the signal shown in FIG. 8, FIG. 10 schematically illustrates another detector circuit with subtraction of detector element signals.

FIG. 7 shows a detector array 125 with six detector elements that are combined two by two for generation of an output signal 150. As explained above, the detector array 125 is swept once for each passage of an intensity pattern across an individual optical element 118 of the optical array 112. Thus, neighbouring detector elements of the detector array 125 output signals with a 60° phase shift with relation to each other, and the first element and the fourth element of the detector array outputs signals with a 180° phase shift with relation to each other. In FIG. 7, a detector circuit configuration is used, wherein the output signals from the first two elements are combined, and FIG. 8 shows a plot of the resulting signal 150 and FIG. 9 shows the power spectrum 156 of the signal 150. It should be noted that the low frequency part 158 and the second harmonic 160 of the spectrum 156 are quite significant. The low frequency noise leads to a variation of the running mean value which will introduce significant errors in velocity determinations based on zero-crossing detection. The width of the detector has been selected for optimum suppression of the third harmonic of the fundamental frequency. The detector element is assumed to have a rectangular shape and thus, the power spectrum of the detector function is a sinc-squared function. In order to eliminate every third harmonic of the detector output signal, the width of each detector element is selected to be substantially equal to one third of the full width of the detector array that is selected to be equal to the width repetitively swept by an intensity pattern traversing the input plane.

Figure 10:
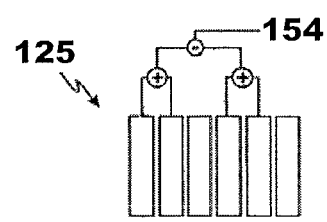
FIG. 10.
Figure 11:
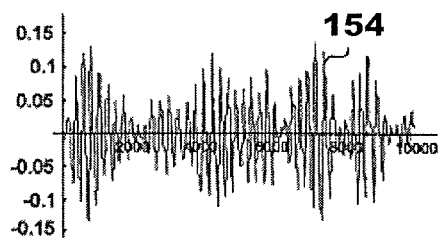
Figure 12:
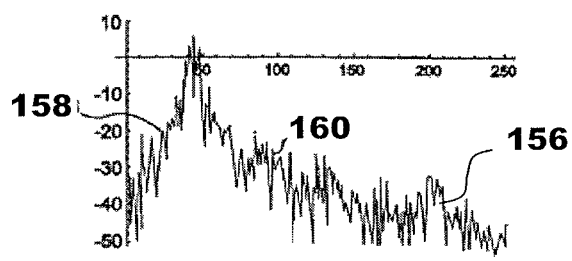
FIG. 12 is a plot of the power spectrum of the signal shown in FIG. 11.

In FIG. 10, a detector circuit for elimination of the low frequency pedestal is shown. The distance between the two pairs of combined elements corresponds to a phase shift of 180°. The output signals from the detector elements are combined for suppression of the low frequency part of the signals and the even harmonic frequencies of the fundamental frequency. The difference signal 154 is plotted in FIG. 11, and the power spectrum 156 is plotted in FIG. 12. The suppression of the low frequency part 158 and the second harmonic 160 is clearly demonstrated by comparison with FIG. 9.

Figure 13:
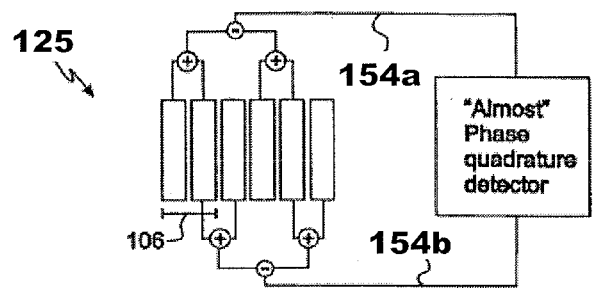
FIG. 13 schematically illustrates yet another detector circuit with subtraction of detector element signals.
Figure 14:
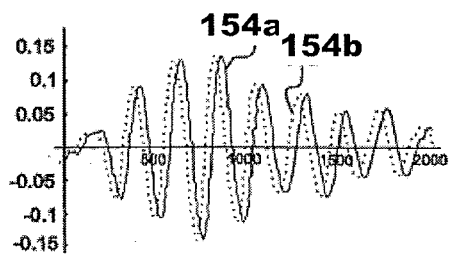
FIG. 14 is a plot of the almost phase quadrature signal provided by the detector circuit shown in FIG. 13.
Figure 15:
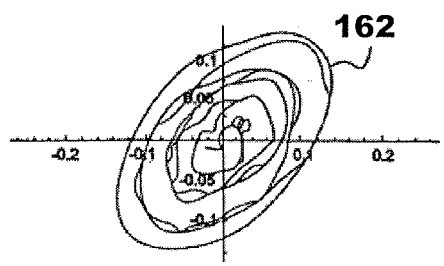
FIG. 15 is a phase plot of the signal shown in FIG. 14, FIG. 16 schematically illustrates still another detector circuit with subtraction of detector element signals.

An almost-phase-quadrature detector circuit configuration is shown in FIG. 13, wherein output signals from six detector elements of equal size are combined to form two signals 154a, 154b in which the low frequency pedestal has been removed. The two signals 154a, 154b are 60 degrees out of phase and therefore suitable for determination of the direction of the velocity of the intensity pattern. In this configuration, an exact phase quadrature cannot be achieved without changing the detector width 106 thereby reducing the suppression of the third harmonic. The almost-phase-quadrature signals 154a, 154b are plotted in FIG. 14, and FIG. 15 is a phase plot 162 of the signals 154a, 154b. The phase plot 162 has an elliptical shape which facilitates determination of the direction of the intensity pattern velocity.

Figure 16:
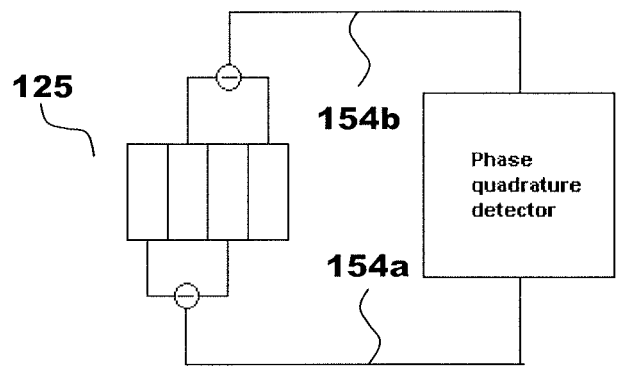
Figure 17:
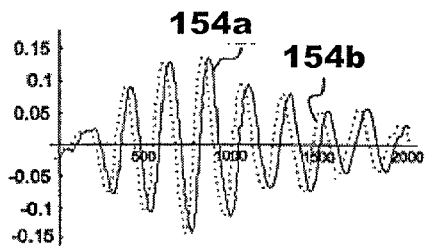
FIG. 17 is a plot of the phase quadrature signal provided by the detector circuit shown in FIG. 16.
Figure 18:
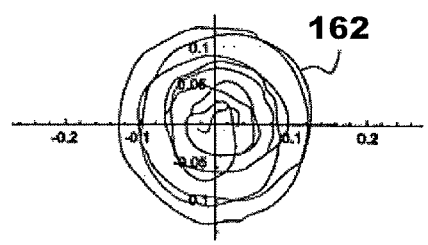
FIG. 18 is a phase plot of the signal shown in FIG. 17, FIG. 19 schematically illustrates an exemplary vector velocimeter according to the invention, FIG. 20 schematically illustrates another exemplary vector velocimeter according to the invention, FIG. 21 schematically illustrates yet another exemplary vector velocimeter according to the invention, FIG. 22 schematically illustrates still another example of a vector velocimeter according to the invention, FIG. 23 schematically illustrates yet, still another example of a vector velocimeter, according to the invention, FIG. 24 schematically illustrates an exemplary vector velocimeter according to the invention, FIG. 25 schematically illustrates an exemplary vector velocimeter according to the invention, FIG. 26 schematically illustrates an exemplary a detector array and detector circuit, FIG. 27 schematically illustrates another example of a vector velocimeter according to the invention, and FIG. 28 schematically illustrates the detector array of FIG. 27 in detail.

The detector circuit configuration shown in FIG. 16 provides a substantially exact phase-quadrature detector arrangement, wherein output signals from four detector elements of equal size are combined to form two signals 154a, 154b in which the low frequency pedestal has been removed. The two signals 154a, 154b are 90° out of phase and therefore suitable for determination of the direction of the velocity of the intensity pattern. FIG. 17 is a plot of the phase-quadrature signals 154a, 154b, and FIG. 18 is the corresponding phase plot 162. The phase plot 162 is circular facilitating determination of the direction of the object velocity and sub-radian measurement accuracy. The circular shape of the traces in the phase plot makes this configuration robust against noise.

Figure 19:
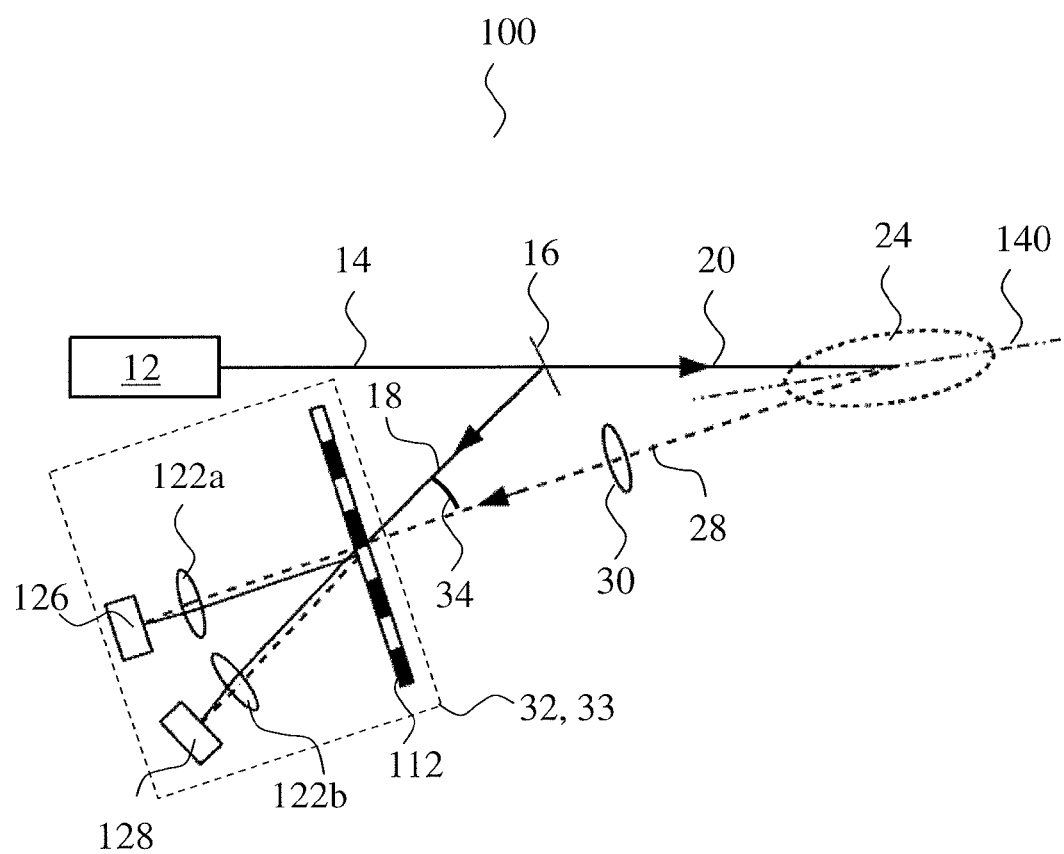

FIG. 19 schematically illustrates a vector velocimeter 100 wherein a laser in a laser assembly 12, for example as disclosed in WO 2009/046717 A2, emits a first coherent light beam 14 of high spatial and spectral beam quality. A beam splitter 16 divides the emitted light beam 14 into a reference beam 18 and a measurement beam 20, and an optical transmitter (not shown) focuses the measurement beam 20 at the measurement volume 24. The optical transmitter 22 may be a Galilean or Keplerian telescope. When the object (not shown) in the measurement volume 24 are illuminated by the measurement beam 20, the object, e.g. aerosols, back scatter a small amount of light forming a signal beam 28 towards an optical receiver 30 that images the measurement volume 24 onto an optical array 112 in a detector arrangement 33 also including lenses 122a, 122b, and detector elements 126, 128. The operation of the detector arrangement is further explained below.

The beam splitter 16 may be formed according to the principles explained in WO 2009/046717 A2, e.g. in connection with FIG. 6, wherein the light assembly 12 comprises a single mode semiconductor laser the optical output of which is collimated into a linearly TM-polarized beam that is fully transmitted through a polarizing beam splitter. A quarter-wave plate changes the transmitted optical output into a circular polarization state. The quarter-wave plate is slightly tilted to avoid back-reflections to reach the laser. Subsequently, the surface of a partly reflecting reference window back-reflects a certain percentage of the laser optical output. The back reflected beam is transmitted back through the quarter-wave plate where it becomes linearly TE-polarized. This TE-polarized beam is fully reflected by the surface of the polarizing beam splitter and forms the reference beam 18. In the vector velocimeter 100, the partly reflecting surface is wedged so that the reference beam 18 forms a first angle 35a with the signal beam 28 as the signal beam 28 and the reference beam 18 are incident on a first detection arrangement 33a in the detection system 32. A main part of the laser optical output is transmitted as circular polarized light through the reference window. The first angle 35a between the reference beam 18 and signal beam 28 leads to formation of a fringe pattern 36 of intensity variations overlaying a speckle pattern 38 that is formed by illumination of the object 26 in the measurement volume 24 by the measurement beam 20 as explained in connection with FIG. 2.

In the illustrated vector velocimeter 100, the signal beam 28 propagates in a direction that forms an angle with the direction of propagation of the measurement beam 20. The fringe distance is determined by first angle 34 between the reference beam 18 and the signal beam 28 at the detector arrangement 33, but the measurement volume 24 is formed in cooperation by the transmitter optics 22 (not shown) transmitting the measurement beam towards the measurement volume 24 and the receiver optics 30 receiving the signal beam emitted from the measurement volume 24 so that the longitudinal direction 140 of the measurement volume 24 in this case does not coincide with the direction of propagation of the measurement beam 20. Instead, the longitudinal direction 140 of the measurement volume forms an angle with the measurement beam 20 and also with the signal beam 28. This angle is half the angle formed between the measurement beam 20 and the signal beam 28, and extends in a plane defined by the measurement beam 20 and the signal beam 28.

Thus, in this case, the direction 140 of maximum Doppler shift does not coincide with the direction of propagation of the measurement beam 20. Instead, the direction 140 of maximum Doppler shift forms an angle with the measurement beam 20, and also with the signal beam 28, that is half the angle between the measurement beam 20 and the signal beam 28 and extends in a plane defined by the measurement beam 20 and the signal beam 28.

The possible movement of the fringe pattern and/or of the speckle pattern at the input plane (not shown) of the optical array 112 in the detector arrangement 33 is determined based on output signals from the detector elements 126, 128 in the detector arrangement 33.

The optical array 112 comprises array elements that in succession redirect features of the intensity pattern towards detector element 126 and detector element 128, respectively. For example, light and dark areas may in succession be redirected towards the detector elements 126, 128 thereby forming an oscillating output signal from the detector elements 126, 128. The optical array 112 may for example be a linear optical array of prisms. The two sides of each prism refract incoming rays of light towards the two respective detector elements 126, 128. The electronic coupling of the detector elements may be performed as explained in connection with FIGS. 5-19.

Contrary to the detector arrangement 33 shown in FIG. 3, light is redirected towards the individual detector elements 126, 128 by an individual lens 122a, 122b so that the detector elements 126, 128 need not be positioned in close relationship to each other.

Figure 20:
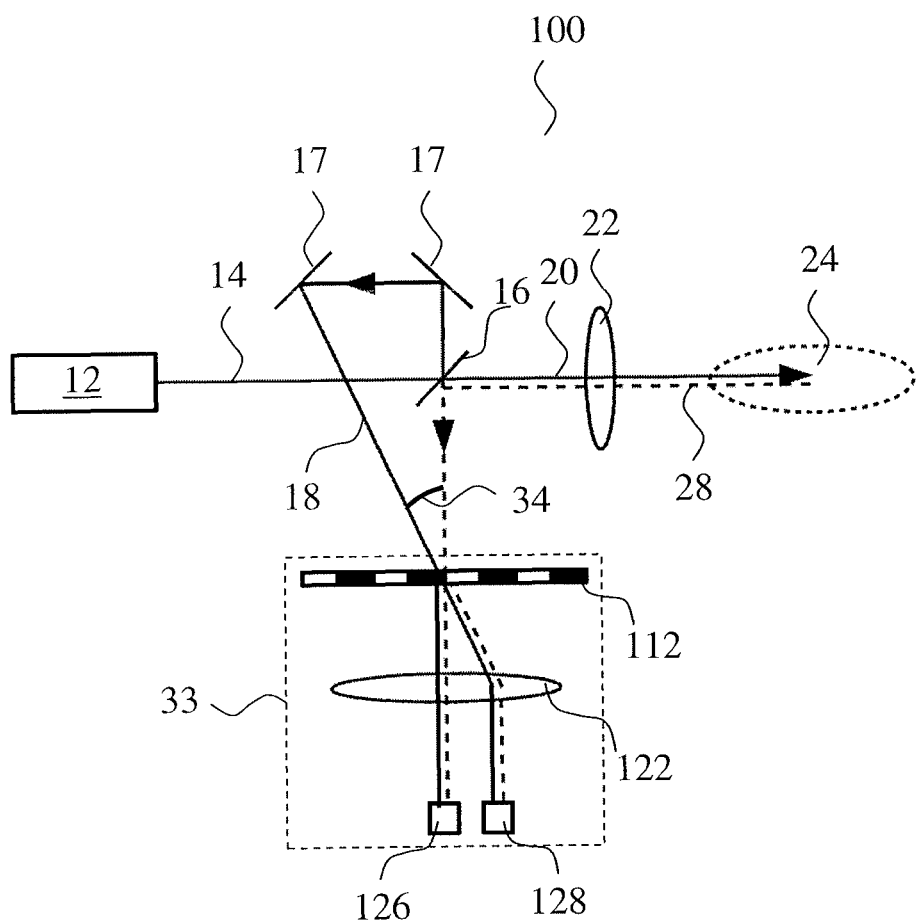

The vector velocimeter shown in FIG. 20 operates in a way similar to the vector velocimeter of FIG. 19; however, in the velocimeter of FIG. 20, the angle 34 required for formation of the fringe pattern 36 is formed by the beam splitter 16 and the mirrors 17 in such a way that the measurement beam 20 and the signal beam 28 propagate along the same path whereby the optical transmitter 22 and receiver 30 can be combined, e.g. in a Galilean or Keplerian telescope. Further, a compact detector arrangement 33 is used with a common lens 122 for redirecting light towards both detector elements 126, 128 positioned in closely spaced relationship to each other.

Figure 21:
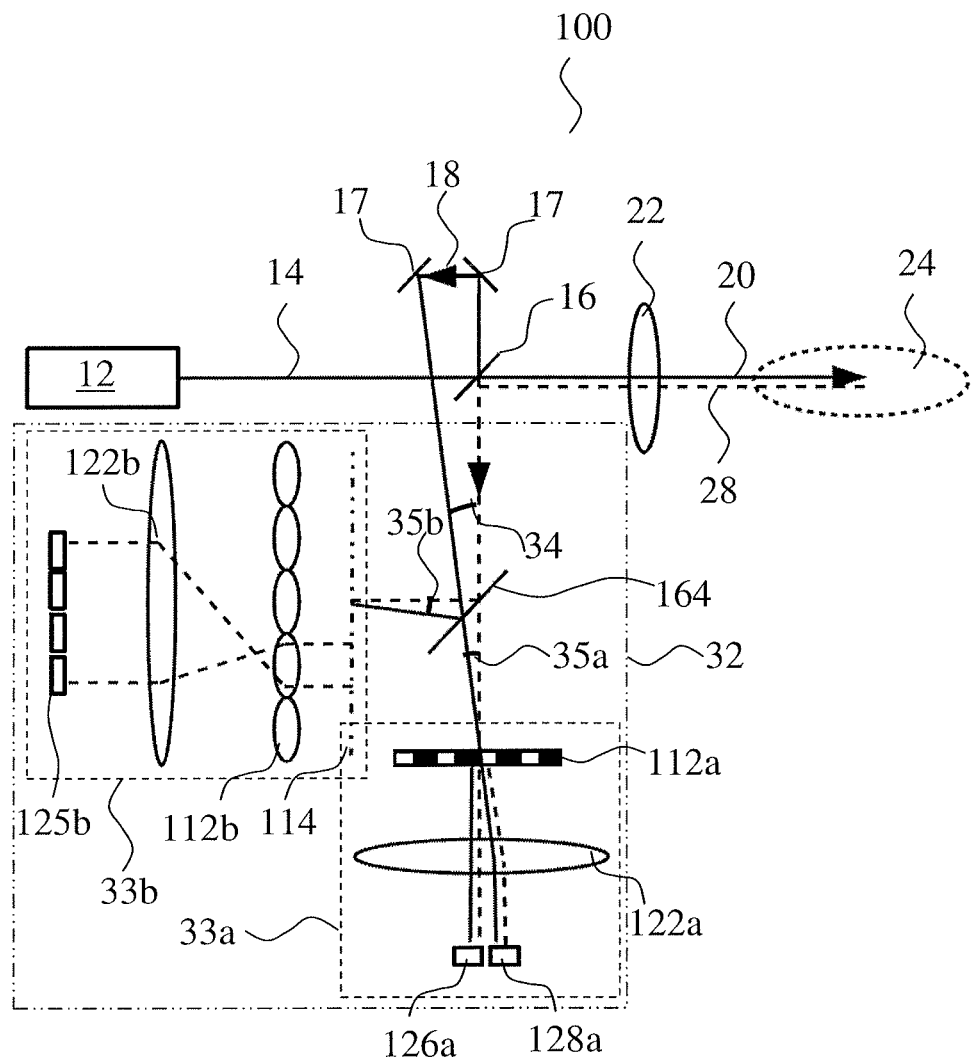

For determination of velocities in two dimensions, a second detector arrangement 33b comprising a second optical array 112b, a second lens 122b, and a second detector array 125b has been added to the detector system 32 in the velocimeter shown in FIG. 21 already comprising the first detector arrangement 33a with a first optical array 112a, a first lens 122a, and a first detector array 125a as described in FIG. 20. The detector system 32 comprises a semi-transparent beam splitter 164, which divides the signal beam 28 and the reference beam 18 so that one part of the beams 18, 28 propagate towards the first detector arrangement 33a and the other part propagate toward second detector arrangement 33b. The operation of the second detector arrangement 33b is explained in connection with FIG. 3. A third detector arrangement 33c (not shown) may be added to the detector system 32 for determination of velocities in three dimensions, e.g. with an orientation perpendicular to the orientation of detector arrangement 33b. The signal beam and the reference beam are incident on the first detector arrangement 33a at a first angle 35a and are incident on the second detector arrangement 33b at a second angle 35b.

Figure 22:
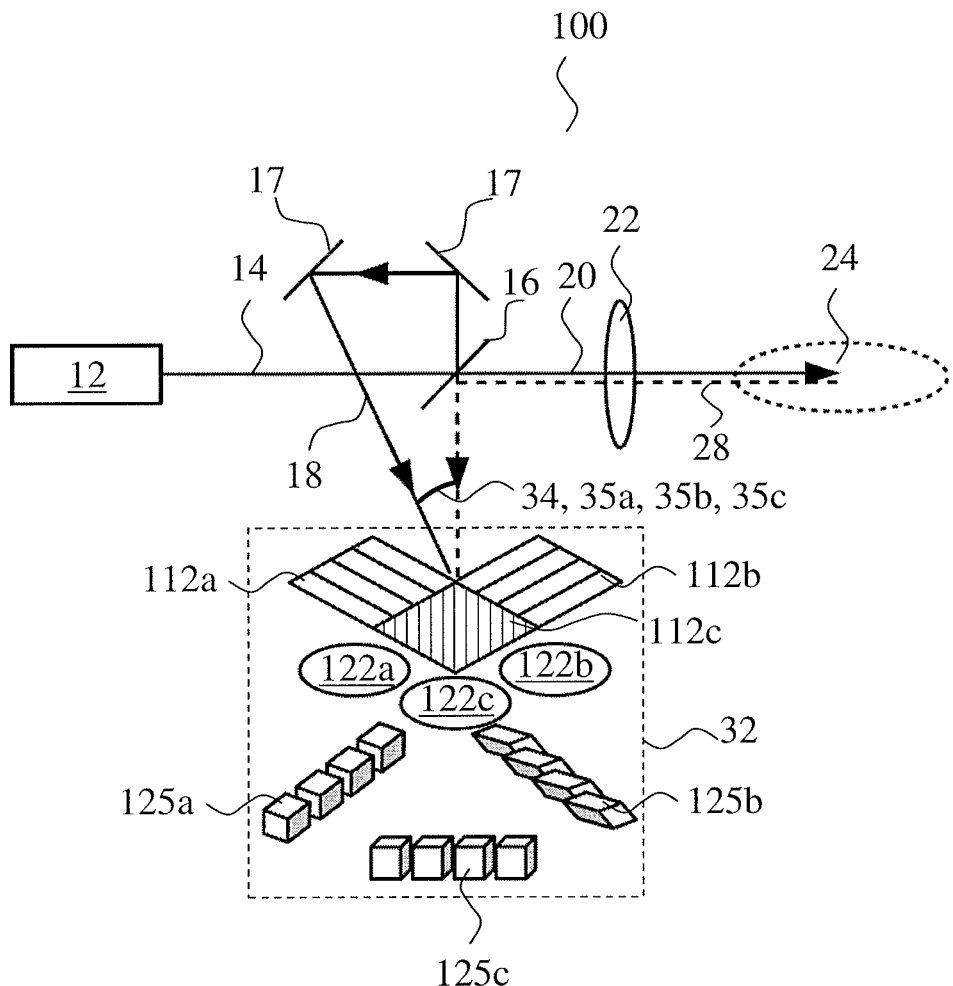

FIG. 22 shows a vector velocimeter 100 similar to the vector velocimeters of FIGS. 21 and 22, but with another detector system 32 comprising an integrated detector arrangement for determination of velocities in three dimensions. The detector system 32 comprises three optical arrays 112a, 112b, 112c with cylindrical lenses. The optical arrays 112a, 112b are positioned and sized for detection of speckle movement along orthogonal directions, i.e. the cylindrical axes of lenses of optical array 112a are perpendicular to the cylindrical axes of lenses of optical array 112b. The third optical array 122c is positioned and sized for detection of fringe movement in a direction forming an angle of 45° in relation to the cylindrical axes of both optical arrays 112a, 112b thereby minimizing interference of fringe movement with speckle movement on optical arrays 112a, 112b, since fringes are aligned with the cylindrical axes of the optical array 112c. The operation of each pair of optical array and detector array 122a, 125a; 122b, 125b; 122c, 125c, respectively, is explained in connection with FIG. 3. The lenses 122a, 122b, 122c may be combined in a single lens. The electronic coupling of the detector elements may be performed as explained in connection with FIGS. 5-19.

Figure 23:
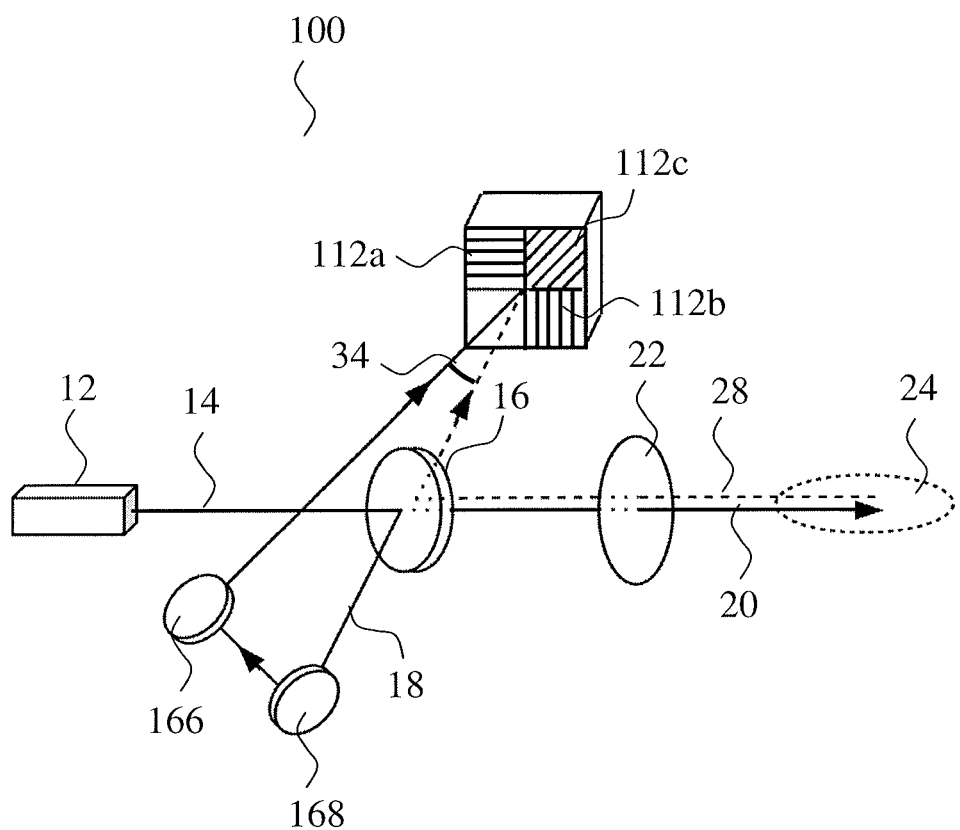

FIG. 23 shows a vector velocimeter 100 that operates in a way similar to the vector velocimeter of FIG. 22; however, the configuration of the optics is different so that the beams propagate out of plane, i.e. the plane defined by the signal beam 28 as redirected by beam splitter 16 forms an angle with the plane defined by the reference beam 18 as redirected by the beam splitter 16 and mirrors 166, 168. The detector arrangement is identical to the arrangement shown in FIG. 22.

Figure 24:
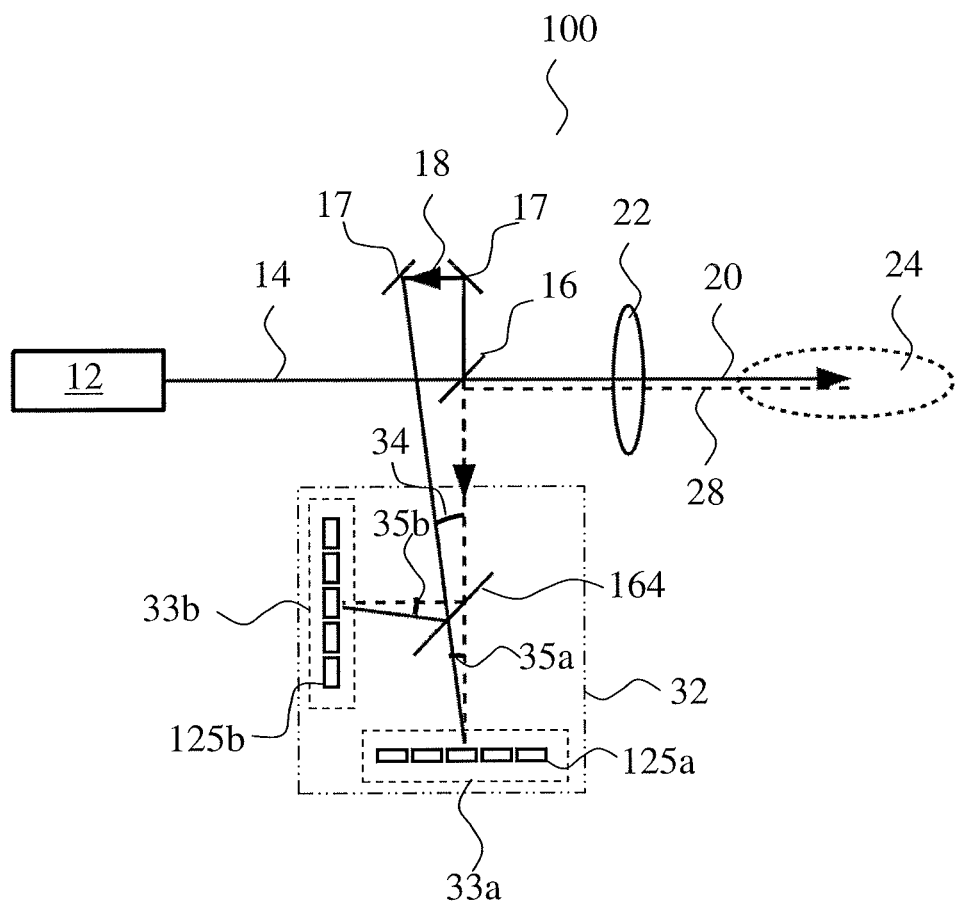

FIG. 24 shows a velocimeter 100, wherein the detector system 32 comprises a semi-transparent beam splitter 164 similar to the one in FIG. 21, which beam splitter 164 divides the signal beam 28 and the reference beam 18 so that one part of the beams 18, 28 propagate towards the first detector arrangement 33a comprising the first detector array 125a and the other part propagate toward the second detector arrangement 33b comprising the second detector array 125b. The signal beam 28 and the reference beam 18 are incident on the first detector arrangement 33a with a first angle 35a between the signal beam 28 and the reference beam 18. Likewise, the signal beam 28 and the reference beam 18 are incident on the second detector arrangement 33a with a second angle 35b between the signal beam 28 and the reference beam 18. The velocities in two dimensions may thereby be determined using detector arrangements 33a, 33b with the two detector arrays 125a, 125b, respectively. A further detector array (not shown) may be added to the detector system 32 for determination of velocities in three dimensions, e.g. with an orientation perpendicular to the orientation of second detector arrangement 33b.

Figure 25:
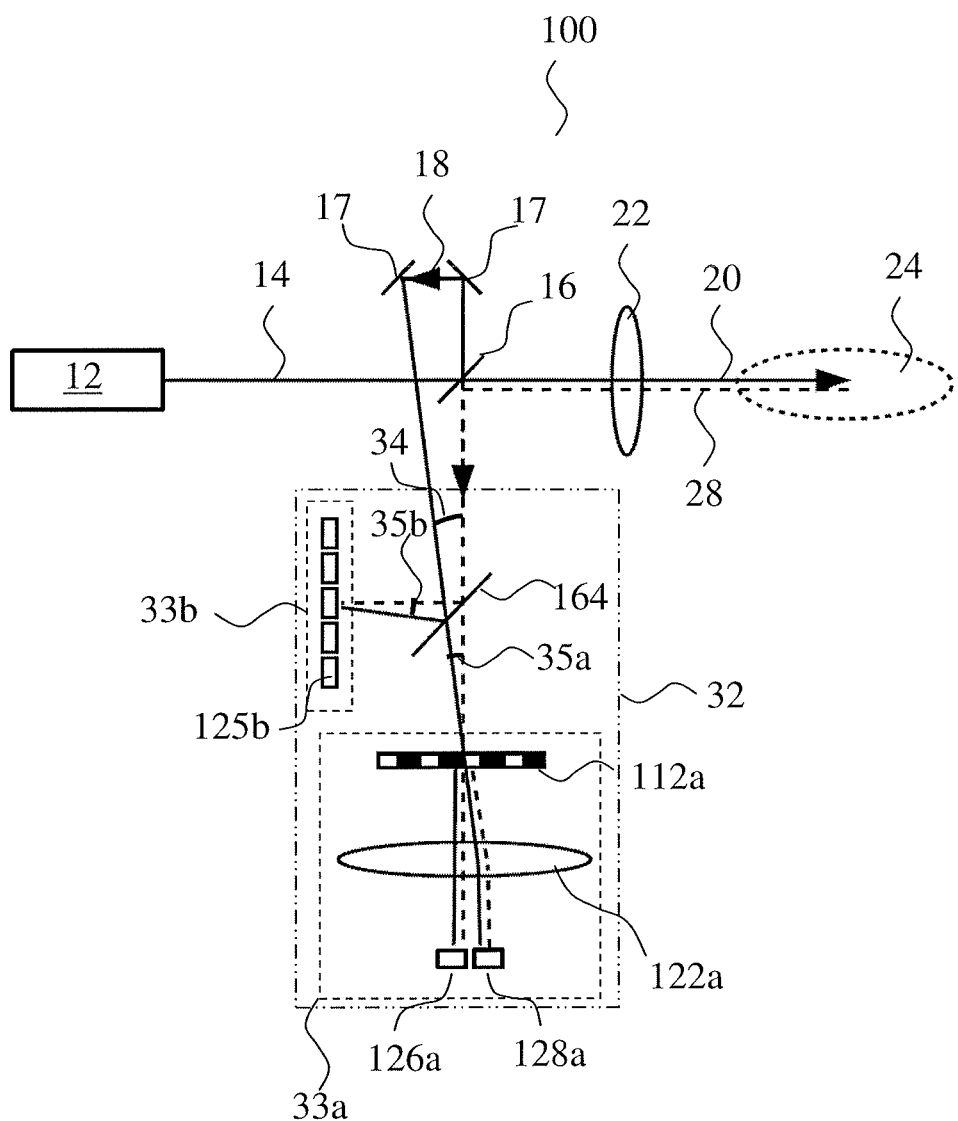

FIG. 25 shows a velocimeter 100, wherein a semi-transparent beam splitter 164 similar to the one in FIGS. 21 and 24 divides the signal beam 28 and the reference beam 18 so that one part of the beams 18, 28 propagate towards the first detector arrangement 33a comprising a first optical array 112a directing the beams at the detector elements 126a, 128a and the other part of the beams 18, 28 propagate toward the second detector arrangement 33b comprising the detector array 125b. A further detector arrangement (not shown) may be added to the detector system 32 for determination of velocities in three dimensions, e.g. with an orientation perpendicular to the orientation of second detector arrangement 33b.

Figure 26:
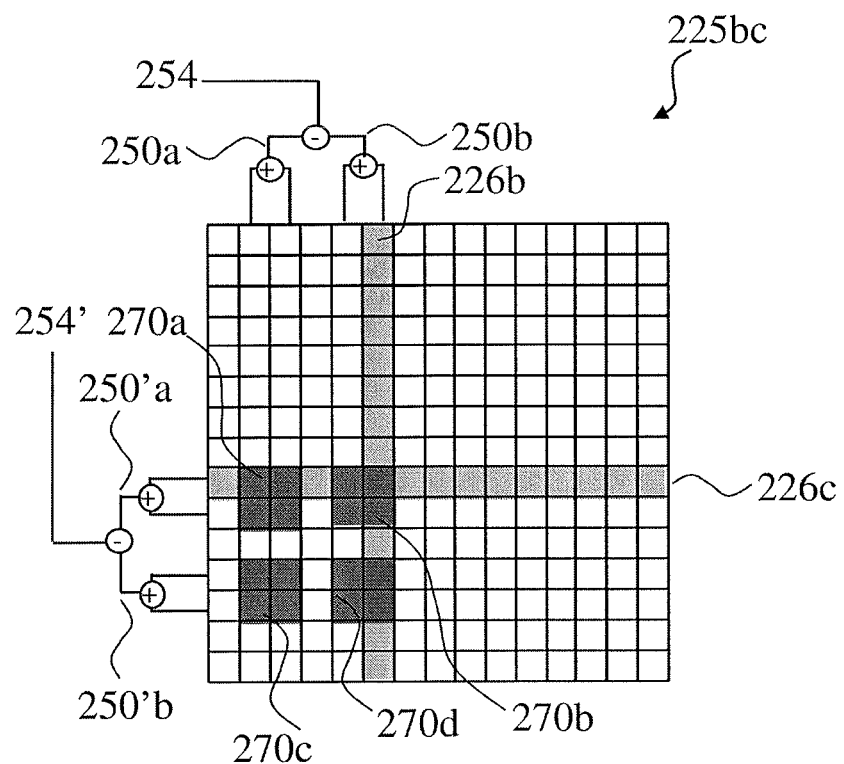

A two-dimensional detector arrangement comprising a two-dimensional detector array 225bc as shown in FIG. 26 may also be applied instead of adding an additional detector arrangement to the detector system 32 in the embodiment shown in FIG. 25 for determination of the velocity in the third dimension. The two-dimensional detector array 225bc is constructed such that it enables determination of the second velocity component by using the second detector elements (exemplified by detector element 226b) and the third velocity component by using the third detector elements (exemplified by detector element 226c) oriented substantially perpendicular in relation to the second detector elements. In this way, the light incident on specific parts 270a, 270b, 270c, 270d of the detector elements is used both for the determination of the second and the third velocity component. This provides for a compact solution, wherein the double utilization of the light increases the signal-to-noise ratio.

In the shown example of the detector array 225bc, a detector circuit the output signal 250a, 250'a, 250b, 250'b and the difference spectrum 254, 254' are generated as shown and explained in FIGS. 7-12. Different signal processing configurations such as those shown and explained in FIGS. 13-18 could also be used.

The detector array 225bc may in one example be a complementary metal-oxide-semiconductor (CMOS), possibly coupled to a high-resolution CCD (charge-coupled device) camera.

Figure 27:
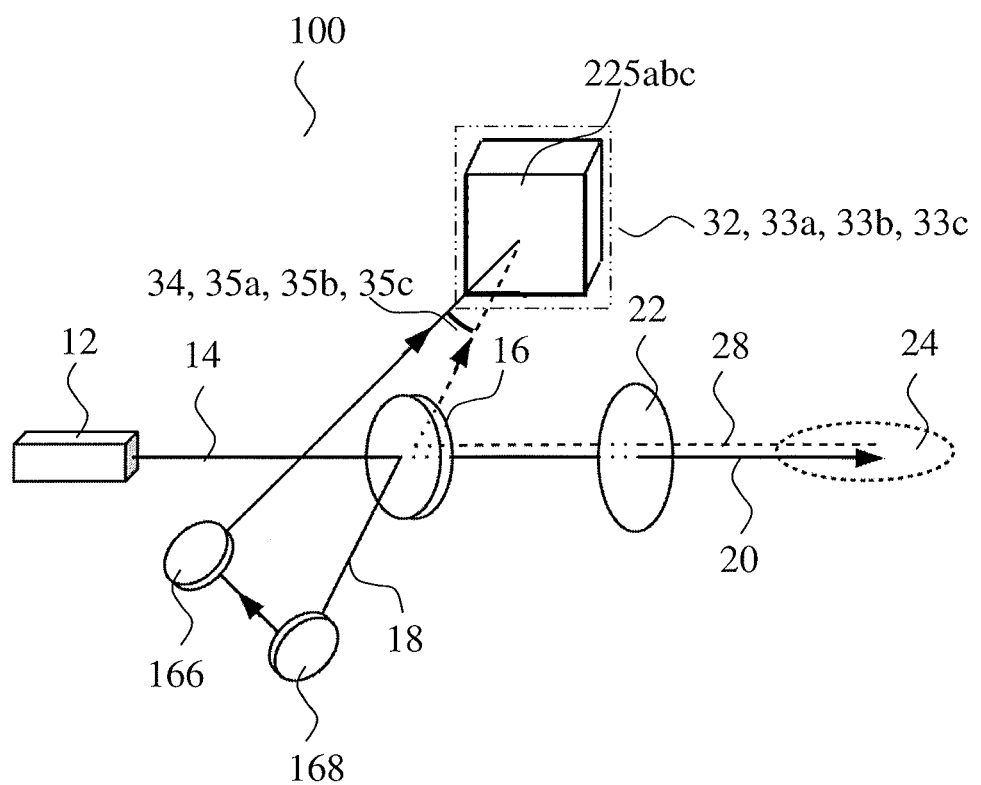
Figure 28:
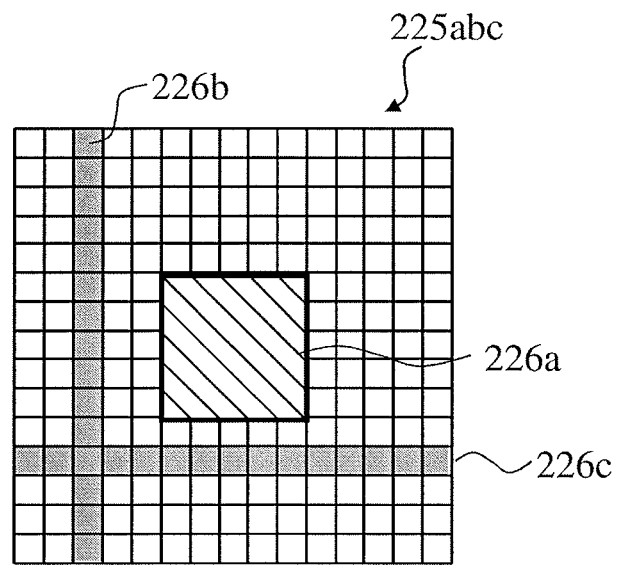

FIG. 27 shows a vector velocimeter 100, wherein the configuration of the optics before the detector system 32 comprising the detector array 225abc is similar to the one shown and explained in FIG. 23. In the detector array 225abc, shown in detail in FIG. 28, additional detector elements 226a has been added to the detector array 225bc shown and explained in FIG. 26. The additional detector elements 226a are for detection of the fringe movement and therefore oriented such that they form a substantially 45 degree angle with the detector elements for detection of the speckle movement (exemplified by detector elements 226b, 226c). This enables determination of velocities in three dimensions using only one integrated detector array 225abc, and provides for an even more compact solution, wherein the multiple utilization of the light increases the signal-to-noise ratio.

The detector elements (exemplified by detector element 226a) used for detection of the fringe are normally high-resolution detector elements.

REFERENCE LIST 1 conventional LIDAR system
2 laser
3 light beam
4 beam splitter
5 reference beam
6 measurement beam
7 imaging optics
8 measurement volume
9 object
10 signal beam
11 LIDAR detector
12 laser assembly
14 first coherent light beam
16 beam splitter
18 reference beam
20 measurement beam
22 optical transmitter
24 measurement volume
26 object
28 signal beam
30 optical receiver
32 detector system
33 detector arrangement
33a first detector arrangement
33b second detector arrangement
33c third detector arrangement
34 angle between signal beam (28) and reference beam (18)
35a first angle between signal beam (28) and reference beam (18)
35b second angle between signal beam (28) and reference beam (18)
35c third angle between signal beam (28) and reference beam (18)
36 fringe pattern
38 speckle pattern
100 vector velocimeter
112 optical array
112a first optical array
112b second optical array
114 input plane
115 output plane
116 direction of propagation of the incoming light (18, 28)
118 cylindrical lenses
120 redirected light
122 lens
122a first lens
122b second lens
122c third lens
124 light propagation towards the detector array (125)
125 detector array
125a first detector array
125b second detector array
125c third detector array
126 detector element
128 detector element
130 detector element
132 area of the input plane
134 area of a detector element
136 area of the input plane
138 a distance in the input plane
140 longitudinal direction of the measurement volume (24)
150 a first output signal
152 a second output signal
154 difference spectrum
154a difference spectrum
154b difference spectrum
156 power spectrum
158 low frequency part of the power spectrum (156)
160 second harmonic part of the power spectrum (156)
162 phase plot 166 mirror
168 mirror
225*bc* two-dimensional detector array
225*abc* three-dimensional detector array
226*a* detector element
226*b* detector element
226*c* detector element
250*a* output signal
250'*a* output signal
250*b* output signal
250'*b* output signal
254 difference spectrum
254' difference spectrum
270*a* part of a detector element
270*b* part of a detector element
270*c* part of a detector element
270*d* part of a detector element

The invention claimed is:

1. A vector velocimeter, comprising:
a laser assembly for emission of a measurement beam with a wavelength for illumination of an object in a measurement volume with coherent light whereby a signal beam emanating from the object in the measurement volume is formed in response to illumination of the object by the measurement beam;
a reference beam generator for generation of a reference beam;
a detector system including a first detector arrangement arranged in such a way that the signal beam and the reference beam are incident upon the first detector arrangement with the reference beam propagating at a first angle θ relative to a signal beam, and wherein the first detector arrangement includes a first detector array of first detector elements, each of the first detector elements converting the intensity of the interfering signal beam and reference beam incident thereupon into a corresponding electronic detector element signal thereby generating an oscillating electronic detector element signal when the fringe pattern formed by the interfering signal beam and reference beam moves across the first detector array; and
a signal processor configured to generate a velocity signal corresponding to a first velocity component of movement of the object in the measurement volume in the longitudinal direction of the measurement volume based on the electronic detector element signals from each of the first detector elements.

2. A vector velocimeter according to claim 1, wherein the first angle between the signal beam and the reference beam incident on the first detection arrangement are related to a period Λ of the first detector arrangement as $\lambda/(2\Lambda) < \theta < 2\lambda/\Lambda$, the period of the first detector arrangement being the width of a first detector array unit having 1, 2, 3, 4, 5, or more individual detector elements.

3. A vector velocimeter according to claim 1, wherein the first angle between the signal beam and the reference beam incident on the first detection arrangement is in the range from 1° to 10°.

4. A vector velocimeter according to claim 1, wherein the fringe pattern comprises individual fringes separated by a fringe distance, the fringe distance at the first detector arrangement being substantially identical to the period of the first detector arrangement for maximization of the resulting electronic detector element signal when the fringe pattern moves across the first detector arrangement elements.

5. A vector velocimeter according to claim 1, wherein the detector system further comprises a second detector arrangement arranged in such a way that the signal beam is incident upon the second detector arrangement, the second detector arrangement including a second detector array of second detector elements, each of the second detector elements converting the intensity of the signal beam incident thereupon into a corresponding electronic detector element signal thereby generating an oscillating electronic detector element signal when speckle patterns of the signal beam move across the second detector array,
wherein the signal processor is further configured to generate a velocity signal corresponding to a second velocity component of movement of the object in the measurement volume based on the electronic detector element signals from each of the second detector elements, and wherein
the second detector array is further arranged so that the direction of the second velocity component is different from the first velocity component.

6. A vector velocimeter according to claim 5, wherein the average size of speckles formed at the second detector arrangement is less than a period of the second detector arrangement for maximization of the resulting electronic detector element signal when the speckles move across the second detector arrangement, the period of the second detector arrangement being the width of a second detector array unit having 1, 2, 3, 4, 5, or more individual detector elements.

7. A vector velocimeter according to claim 6, wherein the average size of speckles formed at the second detector arrangement is 2-5 times smaller the period of the second detector arrangement.

8. A vector velocimeter according to claim 5, wherein the first and second detector arrays are integrated into a single detector array.

9. A vector velocimeter according to claim 5, wherein the detector system further comprises a third detector arrangement arranged in such a way that the signal beam is incident upon the third detector arrangement, the third detector arrangement including a third detector array of third detector elements, each of the third detector elements converting the intensity of the signal beam incident thereupon into a corresponding electronic detector element signal thereby generating an oscillating electronic detector element signal when speckle patterns of the signal beam move across the third detector array,
wherein the signal processor is further configured to generate a velocity signal corresponding to a third velocity component of movement of the object in the measurement volume based on the electronic detector element signals from each of the third detector elements, and wherein
the third detector array is further arranged so that the direction of the third velocity component is different from the first and second velocity components.

10. A vector velocimeter according to claim 9, wherein the average size of speckles formed at the third detector arrangement is less than a period of the third detector arrangement for maximization of the resulting electronic detector element signal when the speckles move across the third detector arrangement, the period of the third detector arrangement being the width of a third detector array unit including 1, 2, 3, 4, 5, or more individual detector elements.

11. A vector velocimeter according to claim 10, wherein the average size of speckles formed at the third detector arrangement is 2-5 times smaller than the period of the third detector arrangement.

12. A vector velocimeter according to claim 9, wherein the second and third detector arrays are integrated into a single detector array.

13. A vector velocimeter according to claim 9, wherein the first, the second and third detector arrays are integrated into a single detector array.

14. A vector velocimeter according to claim 1, wherein the first detector arrangement further comprises a first optical array of first optical elements arranged in such a way that the signal beam and reference beam propagating at an angle relative to a signal beam are incident upon the first optical array, each of the first optical elements redirecting the incident interfering signal beam and reference beam towards the first detector array of first detector elements arranged so that the redirected signal beam and reference beam from the first optical elements are incident upon the first detector array.

15. A vector velocimeter according to claim 14, wherein the fringe distance at the first optical array of first optical elements is substantially identical to the width of an individual first optical element of the first optical array for maximization of the resulting electronic detector element signal when the fringe pattern moves across the first optical array of first optical elements.

16. A vector velocimeter according to claim 5, wherein the second detector arrangement further comprises a second optical array of second optical elements arranged in such a way that the signal beam is incident upon the second optical array, each of the second optical elements redirecting the incident signal beam towards the second detector array of second detector elements arranged so that the redirected signal beam from the second optical elements is incident upon the second detector array.

17. A vector velocimeter according to claim 16, wherein the average size of speckles formed at the second optical array of second optical elements is less than the width of an individual second optical element of the second optical array for maximization of the resulting electronic detector element signal when the speckles move across the second optical array of second optical elements.

18. A vector velocimeter according to claim 17, wherein the average size of speckles formed at the second optical array of second optical elements is 2-5 times smaller than the width of an individual second optical element of the second array.

19. A vector velocimeter according to claim 9, wherein the third detector arrangement further comprises a third optical array of third optical elements arranged in such a way that the signal beam is incident upon the third optical array, each of the third optical elements redirecting the incident signal beam towards the third detector array of third detector elements arranged so that the redirected signal beam from the third optical elements is incident upon the third detector array.

20. A vector velocimeter according to claim 19, wherein the average size of speckles formed at the third optical array of third optical elements is less than the width of an individual third optical element of the third optical array for maximization of the resulting electronic detector element signal when the speckles move across the third optical array of third optical elements.

21. A vector velocimeter according to claim 20, wherein the average size of speckles formed at the third optical array of third optical elements is 2-5 times smaller than the width of an individual third optical element of the third array.

22. A vector velocimeter according to claim 14, wherein the first, second and/or third optical elements of the first, second and/or third optical array, respectively, are selected from the group consisting of cylindrical lenses, spherical lenses, Fresnel lenses, ball lenses, phase gratings, amplitude gratings, diffractive gratings, Ronchi rulings, prisms, prism stubs, diffractive gratings, liquid crystals, and mirrors.

23. A vector velocimeter according to claim 16, wherein the first and second optical arrays are integrated into a single optical array.

24. A vector velocimeter according to claim 19, wherein the second and third optical arrays are integrated into a single optical array.

25. A vector velocimeter according to claim 1, wherein the width of the electronic detector elements has been selected for optimum suppression of the third harmonic of the fundamental frequency of the detector signal.

26. A vector velocimeter according to claim 1, wherein at least one of the detector arrays comprises a first set of two electronic detector elements with a mutual distance corresponding to a phase shift of substantially 180° at the fundamental frequency of the respective detector element signal.

27. A vector velocimeter according to claim 26, wherein the at least one of the detector arrays further comprises a second set of two electronic detector elements with a mutual distance corresponding to a phase shift of substantially 180° at the fundamental frequency of the respective detector element signal, the two sets having a mutual distance corresponding to a phase shift allowing phase quadrature detection.

28. A vector velocimeter according to claim 1, further comprising electronic detector elements that are displaced in relation to each other for provision of respective output signals that are statistically independent of each other whereby the influence of lack of signal due to signal drop out can be minimized.

29. A vector velocimeter according to claim 1, wherein the laser assembly is an all semiconductor laser assembly.

30. Use of a vector velocimeter according to claim 1, for determining velocities of particles suspended in a gas or fluid flow, and/or velocity, displacement, rotation, and/or vibration of a solid surface.

31. Use of a vector velocimeter according to claim 30, wherein particles includes molecules, atoms, aerosols, such as water droplets, or dust.

* * * * *